(12) United States Patent
Khan et al.

(10) Patent No.: US 6,483,563 B2
(45) Date of Patent: Nov. 19, 2002

(54) BRIGHTNESS ENHANCEMENT FOR BISTABLE CHOLESTERIC DISPLAYS

(75) Inventors: Asad A. Khan, Kent, OH (US); Xiao-Yang Huang, Stow, OH (US); J. William Doane, Kent, OH (US); Gene A. Miceli, Streetsboro, OH (US); Donald J. Davis, Conneaut Lake, PA (US)

(73) Assignee: Kent Displays, Inc., Kent, OH (US)

( * ) Notice: Subject to any disclaimer, the term of this patent is extended or adjusted under 35 U.S.C. 154(b) by 0 days.

(21) Appl. No.: 09/973,243

(22) Filed: Oct. 9, 2001

(65) Prior Publication Data

US 2002/0101554 A1 Aug. 1, 2002

Related U.S. Application Data

(63) Continuation of application No. 09/378,830, filed on Aug. 23, 1999, now abandoned.

(51) Int. Cl.[7] .................................. G02F 1/1375
(52) U.S. Cl. ............................... 349/115; 349/169
(58) Field of Search ................................. 349/115, 169

(56) References Cited

U.S. PATENT DOCUMENTS

| | | |
|---|---|---|
| 4,097,127 A | 6/1978 | Haas et al. |
| 5,251,048 A | 10/1993 | Doane et al. |

(List continued on next page.)

OTHER PUBLICATIONS

A. Khan et al., P–49: *Characterization of the Helical–Axis Distribution in Reflective Cholesteric LCD's,* Proc. of SID 96, 607 (1996).

B. Taheri et al, *5.3:Optical Properties of Bistable Cholesteric Reflective Displays,* Proc. of SID 96, 39 (1996).

(List continued on next page.)

*Primary Examiner*—James Dudek
(74) *Attorney, Agent, or Firm*—Watts Hoffmann Fisher & Heinke

(57) ABSTRACT

The present invention is directed to a cholesteric liquid crystal display that includes a homogeneous alignment surface effective to provide increased brightness, low focal conic reflectance and/or reflected light that is to a significant degree circularly polarized. The homogeneous alignment surface substantially homogeneously aligns the liquid crystal director adjacent thereto. The homogeneous alignment surface may be disposed on one or both sides of a cell of the display. In the case of a cell in which the homogeneous alignment surface is disposed on only one side, the substrate with the inhomogeneous alignment surface may be upstream or downstream of the substrate with the homogeneous alignment surface relative to a direction of incident light. Also included especially in the case of a cell that has the homogeneous alignment surface on both sides is the use of a polarizer to provide very good brightness and low focal conic reflectance. Such a cell may employ an alignment layer material with a high pretilt angle. A stacked display may be produced including at least one cell with at least one homogeneous alignment surface. In particular, a stacked cell display may include a lower cell with two homogeneous alignment surfaces and an upper cell in which the top side has an inhomogeneous alignment surface and the bottom side has a homogeneous alignment surface. The present invention achieves any one or combinations of the above features through the use of the homogeneous alignment surface produced with a predetermined alignment layer material and predetermined alignment conditions. The invention also includes a method of making the inventive display and the stacked inventive display.

63 Claims, 11 Drawing Sheets

(2 of 11 Drawing Sheet(s) Filed in Color)

U.S. PATENT DOCUMENTS

| | | |
|---|---|---|
| 5,384,067 A | 1/1995 | Doane et al. |
| 5,437,811 A | 8/1995 | Doane et al. |
| 5,453,863 A | 9/1995 | West et al. |
| 5,608,553 A | 3/1997 | Kim |
| 5,644,330 A | 7/1997 | Catchpole et al. |
| 5,673,128 A | 9/1997 | Ohta et al. |
| 5,677,746 A | 10/1997 | Yano |
| 5,691,795 A | 11/1997 | Doane et al. |
| 5,695,682 A | 12/1997 | Doane et al. |
| 5,748,277 A | 5/1998 | Huang et al. |
| 5,764,322 A | 6/1998 | Mamiya et al. |
| 5,796,454 A | 8/1998 | Ma |
| 5,844,540 A | 12/1998 | Terasaki |
| 5,847,798 A | 12/1998 | Yang et al. |
| 5,920,368 A | 7/1999 | Hatano et al. |
| 5,939,840 A | 8/1999 | Nakagawa et al. |
| 5,956,113 A | 9/1999 | Crawford |
| 5,986,727 A | 11/1999 | Fukui et al. |
| 6,023,316 A | 2/2000 | Yano |
| 6,027,222 A | 2/2000 | Oki et al. |
| 6,064,455 A | 5/2000 | Kim |
| 6,104,455 A | 8/2000 | Kashima |
| 6,122,024 A | 9/2000 | Molsen et al. |
| 6,147,724 A | 11/2000 | Yoshii et al. |
| 6,154,262 A | 11/2000 | Ogura |
| 6,164,790 A | 12/2000 | Lee |
| 6,377,321 B1 * | 4/2002 | Khan et al. .................. 349/35 |
| 6,392,725 B1 * | 5/2002 | Harada et al. ................ 349/74 |

OTHER PUBLICATIONS

X.-Y. Huang et al., *LP–1: Late–News Poster: Gray Scale of Bistable Reflective Cholesteric Displays,* Proc. of SID 98, 810 (1998).

D.-K. Yang et al., *40:1 Invited Address: Cholesteric Liquid–Crystal/Polymer–Gel Dispersions: Reflective Display Applications,* Proc. of SID 92, 759 (1992).

D.-K Yang et al., *Cholesteric Liquid Crystal/Polymer Gel Dispersion Bistable At Zero Field,* IDRC 1991, 49 (1991).

M. Schadt et al., *Surface–Induced Parallel Alignment of Liquid Crystals by Linearly Polymerized Photopolymers,* Jpn. J. Appl. Phys. vol. 3, pp. 2155–2164 (Jul. 1992).

L. Schlangen et al., *Electro–Optics of Reflective Bistable Chiral Nematic Liquid Crystal Displays: Temperature, Cell-gap and Polymide Thickness Dependence,* Proc. of Asia Display 98, 123 (1998).

J. Doane et al., *S3–6 Front–Lit Flat Panel Display from Polymer Stabilized Cholesteric Textures,* Japan Display '92, 73 (1992).

* cited by examiner

BRIGHTNESS ENHANCEMENT FOR BISTABLE CHOLESTERIC DISPLAYS

RELATED APPLICATIONS

The present application is a continuation of U.S. patent application Ser. No. 09/378,830, filed on Aug. 23, 1999, now abandoned entitled "Brightness Enhancement for Bistable Cholesteric Displays."

FIELD OF THE INVENTION

The present invention is directed to reflective cholesteric liquid crystal displays and, in particular, to the use and treatment of alignment layer materials to improve performance of such displays.

BACKGROUND OF THE INVENTION

Liquid crystal displays have brought to the world a low-power, flat-screen technology that has enabled many new portable devices. As the demand for more portable devices grows, so does the demand for displays with improved performance. Reflective displays are important not only because they reduce power consumption, but also because they can be clearly seen in sunlight. Displays with bistable memory are attractive for reducing power consumption and increasing battery life compared to displays in which the image needs to be continuously refreshed.

Bistable liquid crystal displays were developed using cholesteric liquid crystalline materials. With a low concentration polymer network, both the focal-conic and planar textures of a cholesteric liquid crystal can be made stable and it is possible to electrically switch between the two states. Reflective cholesteric displays that employ polymer may use cells with rubbed substrates to achieve a homogeneous alignment of the liquid crystal at the surface of the cell substrate. Homogeneous alignment tends to favor the planar texture. The polymer network prevents the focal-conic texture from transforming to the planar texture.

It was discovered that a bistable cholesteric display could be made without a polymer network if inhomogeneous surfaces for the cell substrate were employed. In this case, cell substrates were typically unrubbed. U.S. Pat. No. 5,453,863 describes polymer-free cholesteric display cells which are said to be bistable and can be electrically switched between the two optical textures. The U.S. Pat. No. 5,453,863 discloses that alignment layers of a cell may be rubbed or unrubbed. However, the U.S. Pat. No. 5,453,863 patent does not address the relationship between display performance and variations in the degree of rubbing and choice of alignment layer materials. More importantly, that patent does not disclose how to optimize brightness by increasing the reflectivity of the planar texture or how to optimize contrast by lowering reflectance of the focal conic state. A display with a focal conic state that has high reflectance will have low contrast and is of little commercial value. The U.S. Pat. No. 5,453,863 patent also does not describe how to control the degree of circular polarization of the reflected or transmitted light important in stacked cell configurations.

Cholesteric liquid crystal displays have been popular for portable signs as well as hand held devices where low-power consumption and hence long battery life is important. Being reflective, these displays are readable in bright sunlight as well as room light. A drawback with current cholesteric liquid crystal displays, however, is that their brightness and contrast are not optimized. The brightness is reduced by the defects introduced in the planar texture by the polymer network or by an inhomogeneous surface alignment such as the unrubbed surface in polymer-free displays. Defects also tend to destroy the polarization state of the reflections from the planar texture. Likewise, contrast has been limited by the light scattering nature of the focal-conic texture. Defects in the focal-conic texture affect the light scattering properties of that texture. It is desirable that the focal-conic texture be as transparent as possible in order to show the black or colored back-layer as clearly as possible.

Cholesteric liquid crystal displays may achieve bistability of the focal conic and planar textures through the use of an inhomogeneous aligning surface rather than with polymer present in the bulk of the liquid crystal. An inhomogeneous aligning surface that is typically used in cholesteric liquid crystal displays is in the form of an unrubbed polyimide layer. There are various types of polyimide alignment layer materials characterized by different pretilt angles, or angles by which the liquid crystal director extends from the surface of the substrate. The lack of rubbing results in an azimuthally random distribution of the nematic director at the surface (inhomogeneous alignment). In this case, both the planar and focal-conic textures are stable under zero field conditions. This inhomogeneous alignment layer introduces defects in the uniform planar and focal conic textures, giving them stability, i.e., the ability to maintain set optical textures in the absence of an electric field.

It is conventionally believed that a very high brightness "perfect planar" texture may be induced by homogeneous alignment of the liquid crystal director. However, such an alignment condition alone does not stabilize the focal-conic texture and provide it with desirable low reflectance. It is well known that light reflected from a perfect single domain planar texture is completely circularly polarized. Defects resulting from an inhomogeneous alignment surface or a polymer network substantially reduce the degree of circular polarization of the reflected and transmitted light.

SUMMARY OF THE INVENTION

The present invention is directed to chiral nematic liquid crystal displays which include a "homogeneous" alignment surface on one or both of the substrates (i.e., sides) of a cell. This surface tends to align the liquid crystal director adjacent thereto and provide the display with increased brightness, low focal conic reflectance and/or reflected light that has an increased degree of circular polarization. Aspects of the present invention include a display with one side treated; a display with both sides treated; orientations of a display with the untreated side located nearest to and farthest from a viewer; and a stacked display having a cell with at least one side treated, such as a stacked display in which a second (e.g., lower) cell has both sides treated and a first (e.g., upper) cell has only the side nearest the second cell treated. These different aspects of the invention may be achieved through the use of various alignment techniques such as rubbed polyimide, UV alignment, selection of alignment material such as low or high pretilt, and combinations of the foregoing.

Increased performance of the inventive liquid crystal display is intended to refer to increase compared to a control liquid crystal display device that is identical but has inhomogeneous alignment surfaces such as unrubbed polyimide. With regard to a stacked display, a corresponding cell of the control device should be referred to for purposes of comparison. For example, if a bottom cell of an inventive stacked display has increased brightness, the brightness of a bottom cell of the stacked control display should be considered. Increases of properties are calculated relative to an increase in percentage or degree of the magnitude of the property that is achieved by the control display. For example, an inventive 30% increase in a property, such as brightness, means a brightness that is 1.3 times the brightness of the control display. If not otherwise indicated, it is should be understood that increases or decreases in a property are with regard to the property of the control display.

One embodiment of the present invention is directed to a liquid crystal display having at least one cell with at least one side treated so as to enhance brightness, comprising chiral nematic liquid crystal material having positive dielectric anisotropy. In all embodiments of the present invention, the liquid crystal material is preferably substantially free from polymer. Cell wall structure contains the liquid crystal material. At least one homogeneous alignment surface is effective to substantially homogeneously align the liquid crystal director adjacent thereto. At least one of the cell wall structure and each homogeneous alignment surface cooperates with the liquid crystal material so as to form focal conic and planar textures that are stable in the absence of a field. This homogeneous alignment surface is effective to increase brightness by at least 5% at a wavelength of peak reflection of the planar texture over the reflectance of the planar texture in the control display. More specifically, brightness may be increased by at least 15% and, more preferably, by at least 30%. A device is used for applying an electric field to transform the liquid crystal material to at least one of the focal conic and planar textures.

Another embodiment of the present invention is directed to a liquid crystal display device having a focal conic state of low reflectance, comprising the chiral nematic liquid crystal material, the cell wall structure and the device for applying the electric field described above. At least one homogeneous alignment surface is effective to align the liquid crystal director adjacent thereto. At least one of the cell wall structure and each homogeneous alignment surface cooperates with the liquid crystal material so as to form focal conic and planar textures that are stable in the absence of a field. This homogeneous alignment surface is effective to prevent reflectance by the focal conic texture from exceeding 10% of electromagnetic radiation incident on the display at a wavelength of peak reflection of the planar texture. More specifically, in this embodiment each homogeneous alignment surface may cooperate with the material so as to be effective in increasing brightness by at least 5% at a wavelength of peak reflection of the planar texture. More specifically, brightness may be increased by at least 15% and, more preferably, by at least 30%. In all embodiments of the present invention the inventive liquid crystal display device is characterized by a threshold voltage for multiplexing.

In both of the enhanced brightness and low focal conic reflectance embodiments, the cell wall structure may comprise opposing substrates. A homogeneous alignment surface in the form of a rubbed alignment layer may be disposed adjacent one of the substrates, an inhomogeneous alignment surface being located on the opposing substrate (i.e., a cell treated on one side). In another aspect, homogeneous alignment surfaces in the form of rubbed alignment layer materials are disposed on both substrates (i.e., a cell treated on both sides). The homogeneous alignment surface may be in the form of a rubbed alignment layer material such as polyimide in all aspects and embodiments of the invention.

The liquid crystal material may be selected from the group consisting of various chiral nematic liquid crystal materials each having a pitch length effective to reflect a selected wavelength of electromagnetic radiation, such as at least one of visible and infrared radiation. The device for applying an electric field is effective to provide the liquid crystal material with stable gray scale states. In all embodiments of the invention in which only one substrate of a cell is treated, the untreated substrate may be either upstream or downstream of the homogeneous alignment surface relative to a direction of light incident to the display.

Another embodiment of the present invention relates to a liquid crystal display in which reflected light is to a significant degree circularly polarized, comprising the chiral nematic liquid crystal material, cell wall structure and device for applying the electric field discussed above. At least one homogeneous alignment surface is effective to align the liquid crystal director adjacent thereto. At least one of the cell wall structure and each homogeneous alignment surface cooperates with the liquid crystal material so as to form focal conic and planar textures that are stable in the absence of a field. This homogeneous alignment surface is effective to increase by at least 10% a peak degree of circular polarization of light reflected from the planar texture as compared to the control display.

More specifically, in the case of the display that reflects light exhibiting a significant degree of circular polarization, each homogeneous alignment surface cooperates with the material so as to be effective in increasing brightness by at least 5% at a wavelength of peak reflection of the planar texture as compared to the control display. More specifically, brightness may be increased by at least 15% and, more preferably, by at least 30%. This homogeneous alignment surface may comprise a rubbed alignment layer material disposed adjacent the cell wall structure. The display may include a cell with one side rubbed or both sides rubbed. The display may reflect a particular wavelength of electromagnetic radiation and is suitable for grey scale, as described above.

The display with the circular polarized light feature may include a circular polarizer adjacent the cell wall structure as in the case when both sides of the cell are rubbed. The homogeneous alignment surfaces cooperate with the material effective to enable use of a driving voltage that is not substantially greater than a driving voltage of the control display. This homogeneous alignment surface is characterized by a pretilt angle of greater than about 100 as in the case of a display having opposing homogeneous alignment surfaces in one region.

Another embodiment of the present invention is directed to a stacked liquid crystal display device comprising first chiral nematic liquid crystal material and second chiral nematic liquid crystal material. Between opposing substrates are formed a first region comprising the first material and a second region comprising the second material. The first region is stacked relative to the second region. At least one homogeneous alignment surface is disposed in at least one of the first region and the second region adjacent one of the substrates so as to homogeneously align the liquid crystal director adjacent thereto. At least one of the substrates and each homogeneous alignment surface cooperates with the first material to form in the first region focal conic and planar textures that are stable in the absence of a field, and at least one of the substrates and each homogeneous alignment surface cooperates with the second material to form in the second region stable focal conic and planar textures. One of the substrates and a first homogeneous alignment surface cooperates with the material in the second region so as to be effective in preventing reflection by the focal conic texture in that region from exceeding 10% at a wavelength of peak reflection of the planar texture. A device applies an electric field to transform the first material and the second material to at least one of the focal conic and planar textures.

Reference to properties of a region or cell of the stacked display require examining performance of that cell individually, rather than the entire stacked cell display as a whole. Thus, for example, when referring to a limited focal conic reflectance of a top cell of a stacked cell display, that cell should be examined apart from its behavior in the entire stacked display, such as by placing a black back layer on the individual top cell and then examining the focal conic reflectance of the top cell. It will be appreciated, however, that the improved properties of the present invention may also be observed in terms of the performance of the entire stacked cell display where indicated, such as increased brightness of the entire stacked cell display.

In particular, in this stacked display embodiment a substrate that opposes the first alignment surface may comprise a second homogeneous alignment surface. The second region with the first and second homogeneous alignment surfaces may be disposed downstream of the first region relative to a direction of incident light. A third homogeneous alignment surface may be disposed adjacent one of the substrates in the first region. One of the substrates that opposes the third homogeneous alignment surface in the first region has an inhomogeneous alignment surface. The display enables use of a driving voltage that is not substantially greater than a driving voltage for a corresponding cell in the control display.

In another aspect of the stacked display, one of the substrates that opposes the first homogeneous alignment surface in the second region has an inhomogeneous alignment surface. The first region may include only one homogeneous alignment surface with an opposing substrate with an inhomogeneous alignment surface. In all embodiments herein, each homogeneous alignment surface may comprise a rubbed alignment layer material, such as a rubbed polyimide alignment layer material. The pretilt angle of the homogeneous alignment surface in such a cell may be greater than about 10°.

The stacked display for enhanced brightness may include a first material that has a chirality of an opposite twist sense than a chirality of the second material. At least one of the first and second liquid crystal materials may be selected from the group consisting of various chiral nematic liquid crystal materials each having a pitch length effective to reflect a selected wavelength of electromagnetic radiation such as at least one of visible and infrared radiation. The device for applying an electric field can cause the first and second liquid crystal material to assume stable grey scale states.

Another embodiment of a stacked display for enhanced brightness consists of a stacked display assembly in which the materials in both cells of the display have the same helical twist sense. Both materials may reflect at the same wavelength. In this case, enhanced brightness is achieved by sandwiching a half wave plate between the two cells. The purpose of the half wave plate is to change the handedness of the circularly polarized light.

Another embodiment is a double stacked system where a circular polarizer is sandwiched between the two cells. The use of homogeneously aligned surfaces may be similarly applied to triple or multiple stacked systems to increase the brightness or degree of circular polarization, and/or decrease focal conic reflectance, of full color or multicolor/infrared combinations. At least one of the inventive homogeneous alignment surfaces may be applied in one, two or more cells of double, triple and multiple cell stacked displays. Likewise, a circular polarizer may be inserted in the stack, as would be apparent to those skilled in the art in view of this disclosure.

In the stacked display, the first homogeneous alignment surface may cooperate with the second material so as to be effective in increasing brightness by at least 5% and, in particular, by at least 15% or 30%, at a wavelength of peak reflection of the planar texture in the second region, as well as increase by at least 10% a peak degree of circular polarization of light reflected from the planar texture in the second region. The above increases in brightness and degree of polarization may be observed in any of the stacked cells which employs at least one inventive homogeneous alignment surface.

Another embodiment of the present invention is directed to a liquid crystal display including a cell in which both sides are treated, comprising the chiral nematic liquid crystal material, substrates between which the liquid crystal material is disposed and the device for applying an electric field discussed above. Homogeneous alignment surfaces are adapted to align the liquid crystal director adjacent both of the substrates. The homogeneous alignment surfaces may be characterized by a pretilt angle of greater than about 10° and cooperate with the liquid crystal material to form focal conic and planar textures that are stable in the absence of a field.

More specifically, this display may benefit from the enhanced brightness increase of at least 5% and, in particular, at least 15% or 30%, at a wavelength of peak reflection of the planar texture. The homogeneous alignment surfaces are preferably formed of a rubbed alignment layer material. This display may benefit from the use of liquid crystal materials that can reflect selected wavelengths of electromagnetic radiation and is suitable for grey scale. The display may include a circular polarizer adjacent one of the substrates and use a driving voltage not greater than what is employed in the control display.

The present invention offers numerous advantages such as an ability to enable displays to be tailored so as to produce a variety of properties. Displays may be made so as to have improved brightness (e.g., rubbing one side) and extremely high brightness such as when both sides of the cell are rubbed. Displays may be made so as to have very low brightness of the focal conic texture not greater than 10%. This low focal conic reflectance, such as in the case of cells that have both sides rubbed, is believed to be heretofore unattainable in cholesteric liquid crystal displays. The inventive displays also possess the unique attribute of reflected light which is to a significant degree, circularly polarized, such as cells in which both sides are rubbed. This advantageously permits the use of polarizers, which typically would not be used with cholesteric liquid crystal displays. Rather than decreasing brightness, as would be the case if a polarizer were used in a conventional cholesteric display, since the reflected light is to a significant degree circularly polarized, the polarizer permits the reflected light to pass through, and prevents the passage of backscattered light from the display. Displays may be fabricated to exhibit the inventive enhanced brightness, low focal conic reflectance and increased degree of circular polarization features, and any combination thereof, by using certain alignment layer materials as well as treatment methods such as rubbing pressure and number of rubs.

The stacked display feature illustrates the versatility of the present invention. Such displays may be designed, for example, to take advantage of the very high brightness and degree of circular polarization of a cell rubbed on both sides so as to exhibit a bistable large domain display, while increasing viewing angle by using a top cell in which the top side has an inhomogeneous alignment surface. Such a stacked cell display exhibits a combination of superior brightness, low focal conic reflectance and good viewing angle, which are believed to have been heretofore unattainable.

Yet another embodiment of the present invention is directed to a method of making a cholesteric liquid crystal display comprising applying a preselected alignment layer material to at least one substrate. The alignment layer material is treated under preselected treatment conditions to produce a first homogeneous alignment surface. Chiral nematic liquid crystal material is filled between the first alignment surface and a substrate that opposes the first alignment surface. The liquid crystal material has positive dielectric anisotropy. At least one of the opposing substrate and the first alignment surface cooperates with the liquid crystal material so as to form focal conic and planar textures that are stable in the absence of a field. The first homogeneous alignment surface aligns the liquid crystal director adjacent thereto, based upon the preselected alignment layer material (e.g., high or low pretilt angle) and treatment conditions (e.g., pressure and number of rubs), to cooperate with the liquid crystal material so as to be effective to increase brightness by at least 5% and, in particular, by at least 15% or 30%, at a wavelength of peak reflection of the planar texture. Electrical connections are applied to the substrates to enable means for applying an electric field to transform the liquid crystal material to at least one of the focal conic and planar textures.

More specifically, the alignment layer material and treatment conditions are selected to enable the first homogeneous alignment surface to be effective to prevent reflectance by the focal conic texture from exceeding 10% at a wavelength of peak reflection of the planar texture. The treatment conditions in all aspects of this embodiment may include rubbing the homogeneous alignment material at a particular pressure and for a particular number of times so as to attain the specified improvement in properties. For example, a preferred alignment surface has a pretilt angle of greater than 10°.

The display may include an opposing substrate that is either treated (homogeneous) or untreated (inhomogeneous). In the case of the method of making the display in which only one side is treated, the display may be oriented such that the substrate with the inhomogeneous alignment surface is either upstream or downstream of the substrate with the homogeneous alignment surface. The alignment layer material and treatment conditions may be selected so that the first alignment surface cooperates with liquid crystal material so as to be effective to increase by at least 10% a peak degree of circular polarization of light reflected from the planar texture.

A second homogeneous alignment layer material may be applied to the substrate that opposes the first alignment surface. Both alignment surfaces may cooperate with the liquid crystal material so as to be effective to increase by at least 20% and, in particular, by at least 100%, a peak degree of circular polarization of light reflected from the planar texture.

Another embodiment is directed to a method of making a stacked cholesteric liquid crystal display in which a second region containing liquid crystal material is stacked relative to the first region. The liquid crystal material of the second region has stable focal conic and planar textures. One or both of the first and second regions may include at least one of the homogeneous alignment surfaces so as to produce the increased brightness, low focal conic reflectance and/or increased degree of circular polarization according to the present invention.

In a preferred embodiment the first region includes the homogeneous alignment surface on both sides. The alignment material may be applied to one of the substrates in the second (e.g., upper) region and subjected to the predetermined treatment conditions effective to form a third homogeneous alignment surface. A substrate in the second region that opposes the third homogeneous alignment surface may have an inhomogeneous alignment surface. The first and second regions may be stacked so that the inhomogeneous alignment surface in the second region is upstream of the third homogeneous alignment surface as well as the first region, relative to a direction of incident light. It will be understood that use of such terms as "upper" and "lower", and "first" and "second," are relative and should not be used to limit the invention, such terms also being capable of characterization as "front," "back" or the like.

Another embodiment relates to the ability of the present invention to enable an inventive display to be fabricated with reduced cell spacing with a driver that can operate at a lower voltage or faster than in a comparative display having a cell spacing that is at least 10% greater than the reduced cell spacing, and yet have brightness that is at least as high as in the comparative display. In general, cholesteric displays require relatively high drive voltage. The display cost may be significantly reduced by reducing the drive voltage. As described in this disclosure, the present invention enables displays to be produced with enhanced brightness that in some cases may greatly exceed the brightness of typical displays. One conventional method of reducing the drive voltage is to reduce the cell spacing. However, this generally will also reduce the peak brightness. Due to the enhanced brightness feature of the present invention, inventive displays may obtain at least a conventional degree of brightness with reduced cell spacing effective to enable a lower drive voltage or faster drive to be used.

A display with reduced cell spacing according to this embodiment includes chiral nematic liquid crystal material having positive dielectric anisotropy. Cell wall structure is spaced apart at a reduced cell wall spacing contains the liquid crystal material. At least one alignment surface is effective to substantially homogeneously align the liquid crystal director adjacent thereto. At least one of the cell wall structure and each alignment surface cooperates with the liquid crystal material so as to form focal conic and planar textures that are stable in the absence of a field. Each alignment surface is effective to increase brightness at a wavelength of peak reflection of the planar texture so as to be at least as high as a brightness of the identical comparative liquid crystal display device but with inhomogeneous alignment surfaces and a comparative cell wall spacing that is at least 10% greater. A device applies a drive voltage effective to transform the liquid crystal material to at least one of the focal conic and planar textures.

The reduced cell wall spacing may be effective to enable the drive voltage to be substantially less than a drive voltage of the comparative liquid crystal display device while maintaining the same peak brightness. Reduced cell wall spacing may also be effective to increase the drive speed while maintaining the same peak brightness and drive voltage of the comparative display device.

Many additional features, advantages and a fuller understanding of the invention will be had from the accompanying drawings and the detailed description that follows.

DEFINITIONS

Figure 1:
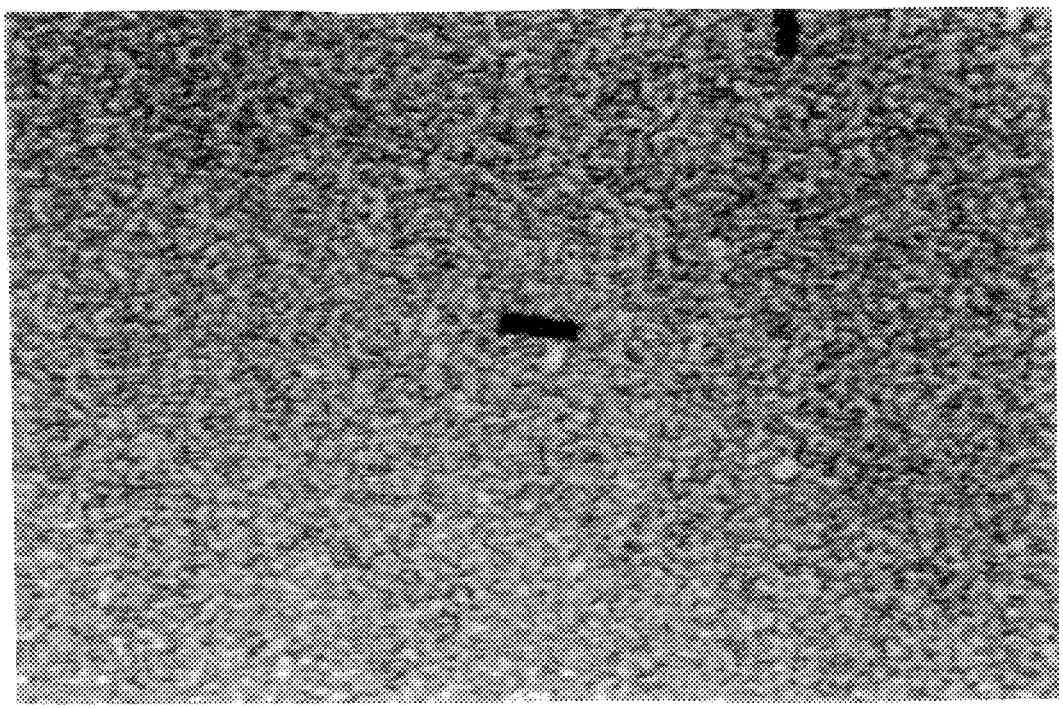
FIG. 1 is a microscope photograph of an unrubbed cell of a cholesteric liquid crystal display.

Terms used in this disclosure are intended to have their ordinary meaning unless otherwise indicated. More detailed definitions of terms used herein are as follows:

1. Peak Brightness: is the maximum relative reflectance of the bright state (planar texture) in percentage of a standard white reflector. The wavelength corresponding to this maximum reflectance is called the "peak wavelength." The brightness of the dark state (focal conic texture) is the relative reflectance at the peak wavelength of the planar texture. See the Brightness Measurement section hereafter for specific measurement information.

2. Bandwidth: is the width of the reflection spectrum at half maximum, measured in nanometers.

3. Chromaticity: is obtained through calculation of the color coordinates from either of the two measurement geometries, focused or collimated as shown in FIG. 5($a$) or 5($b$). Generally, these are represented in the CIE 1931 chromaticity diagram, calibrated to a D65 illuminant.

4. Planar domain: is a region of substantially homogeneous planar texture between defects.

5. Defects: are regions generally smaller in width than domains and confine material having substantially homogeneous planar texture. Defects typically resemble dark boundaries around bright regions in which the material is in the planar state.

6. Homogeneous alignment: means alignment of the liquid crystal director in the same azimuthal direction, such as by rubbing or irradiating a photoalignment material with polarized light.

7. Stable state: is a state in which the material is completely stable at zero field. Whether a liquid crystal material has stable states may be determined for any desired measurement, for example, brightness, focal conic reflectance, and Stokes parameter S3, by using the following measurement technique. The liquid crystal material is placed in the desired state by application of a voltage pulse, removing the pulse, waiting for a time T beginning immediately after the waveform of the pulse goes to zero and making the desired measurement (e.g., a brightness, focal conic reflectance or S3 measurement). After this desired measurement is made, one waits another time T and makes another measurement. If the variation of the two measurements is >5% then the state of the material is not stable. In this case the test is repeated using a greater time interval T. For example, T might be 2 minutes for the first test and 3 minutes for the second test. The same procedure of the first test is then repeated, and increasing time intervals T are used until the variation in measurement is <5%. The material is now in a stable state as defined herein.

8. Stokes parameter S3: is the fourth Stokes parameter defined as the "difference between flux density transmitted by a right-circular polarizer and a left-circular polarizer." See Guenther, R., *Modern Optics*, John Wiley and Sons, p. 46 (1990), which is incorporated herein by reference in its entirety. S3 is the vertical axis on Poincare's sphere, where the poles represent right and left circularly polarized light. Therefore, the range of S3 is defined as follows:

−1≦S3≦+1.

DETAILED DESCRIPTION OF PREFERRED EMBODIMENTS

Referring now to the drawings, the inventive liquid crystal display device includes chiral nematic liquid crystal material which has positive dielectric anisotropy and is substantially free from polymer. Cell wall structure in the form of opposing substrates contains the liquid crystal material. At least one homogeneous alignment surface is effective to align at the liquid crystal director adjacent thereto (i.e., near the cell wall structure). Each homogeneous alignment surface cooperates with the liquid crystal material so as to be effective in preventing reflectance from the focal conic texture from exceeding 10%. At least one of the cell wall structure and the homogeneous alignment surface cooperates with the liquid crystal material to form focal conic and planar textures that are stable in the absence of a field. A device applies an electric field to transform the liquid crystal material to at least one of the focal conic and planar textures.

The present invention may enhance the brightness of cholesteric displays with the use of the homogeneous alignment surface. The term "homogeneous alignment surface" used herein refers to a surface in contact with or near the liquid crystal material of the cell, which preferentially aligns the liquid crystal director in one direction, for example, a treated alignment material such as a rubbed polyimide alignment material or UV photoaligned material. This alignment is preferably substantially homogeneous alignment of the liquid crystal director (i.e., alignment of the director at a pretilt angle in generally one direction).

The texture of the liquid crystal as a result of the advantageous surface treatment of the present invention, and the resulting unique display properties, will now be described. A texture resulting from a conventional cell having an unrubbed alignment layer can be seen in the photograph shown in FIG. 1. In all of the photographs shown herein, the spacer has a width of 5 microns. All of the photographs herein were taken using a reflecting polarizing microscope with crossed polarizers, and viewed at the surface normal, the photographs being taken of textures in zero field stable states. In all of the photographs the liquid crystal material was electrically addressed to be in the planar texture. All of the measurements herein were taken from a single pixel. FIG. 1 shows that the planar domains, which appear bright in the photograph, are relatively small, on the order of about 2 microns, and are uniformly dispersed. The planar domains of this unrubbed cell have a structure that is not very well defined.

Figure 2:
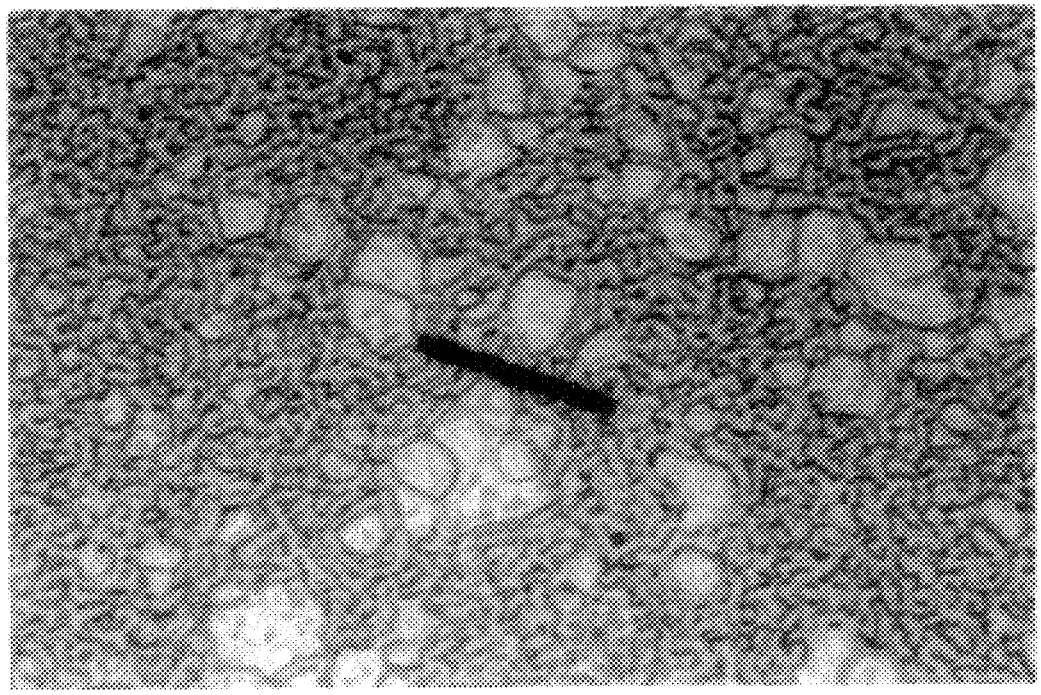
FIG. 2 is a microscope photograph of a cholesteric liquid crystal display cell that is rubbed on one side and unrubbed on the other, as seen from the rubbed side.

A drastic difference is seen when viewing the texture of liquid crystal from a cell that uses the inventive homogeneous alignment surface as shown in FIG. 2. This cell had one side rubbed and one side unrubbed, in accordance with one aspect of the present invention. The photograph of FIG. 2 was taken by viewing from the rubbed side of the cell. The texture shown in FIG. 2 shows large planar domains. The area of the large planar domains is at least 50% greater than an area of planar domains that exist in the absence of the inventive homogeneous alignment surface such as in the case of the planar domains that existed in the unrubbed cell of FIG. 1. Some of the large planar domains in the inventive cell shown in FIG. 2 have an area of much greater than about 10 microns. In addition, the other smaller planar domains, represented by bright regions, have a much more defined, snake-like structure compared to the planar domains in the unrubbed cell.

Figure 3:
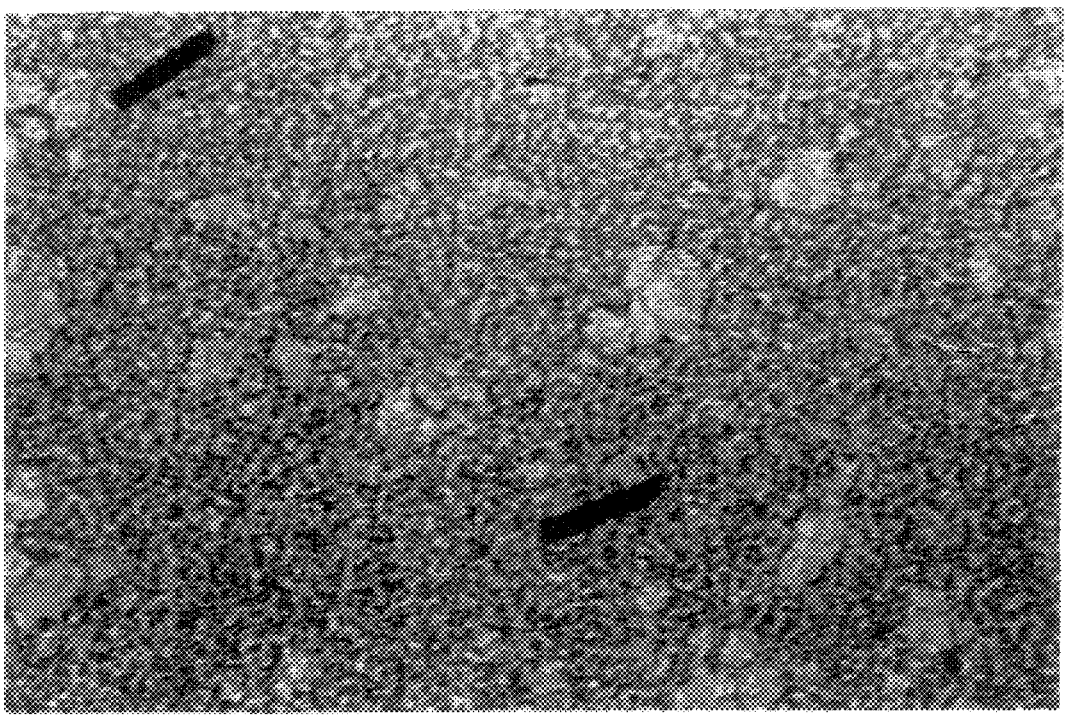
FIG. 3 is a microscope photograph of a cholesteric liquid crystal display cell of FIG. 2 as seen from the unrubbed side.

FIG. 3 is a photograph showing a view of the cell of FIG. 2 from the unrubbed side. This figure reveals a unique phenomena of the present invention. The large planar domains shown in FIG. 2 are only disposed near the rubbed alignment layer material, not near the unrubbed side of the cell, which is evident from FIG. 3 which shows the same size and number of large domains as in FIG. 2, but has a texture that is very similar to the unrubbed texture shown in FIG. 1. That is, there are many small and relatively undefined planar domains compared to even the small domains in FIG. 2. However, a close inspection of FIG. 3 reveals that the undefined small domains cover the very large domains. This indicates that the smaller undefined planar domains seen from the unrubbed side are closer to the viewer than the very large planar domains. Thus, while not wanting to be bound by theory, it is believed that the very large planar domains are formed near the homogeneous alignment surface, not near the inhomogeneous surface, in the cells in which one side is treated (e.g., rubbed) and the other is untreated (e.g., unrubbed). The very large planar domains are believed to account for the very high brightness that is achieved in the inventive cell when viewing from the rubbed side. Orienting the side with the homogeneous alignment surface (e.g., rubbed side) nearer to the viewer or the side with the inhomogeneous alignment surface (e.g., unrubbed side) nearer to the viewer offers a variety of possibilities, such as maximizing brightness of the planar state, in some cases maximizing the degree of reflected light that is circularly polarized, maximizing viewing angle, and/or minimizing focal conic reflection.

Conventional cells having a "perfect planar texture" are well known and are characterized by extremely large planar domains and by being substantially free from defects. As a result, cells having a perfect planar texture have a high brightness approaching maximum reflectance. However, such conventional cells having the perfect planar texture do not have a stable focal conic state. Over time, a preponderance of the focal conic domains obtained after switching in the conventional perfect planar cell are expected to revert back to the planar texture.

Figure 4:
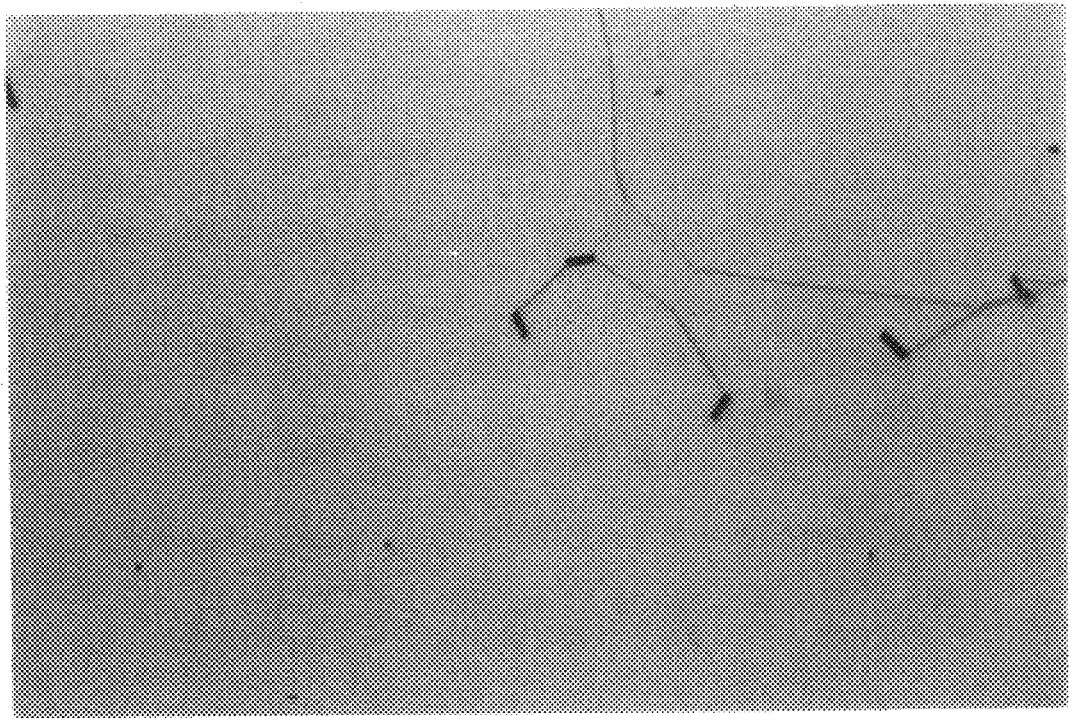
FIG. 4 is a microscope photograph of a cholesteric liquid crystal display cell that is rubbed on both sides and possesses the perfect planar texture in accordance with the present invention.

Perfect planar texture is shown in FIG. 4 for a cell prepared in accordance with one aspect of the present invention. Such cells have the very high brightness of conventional perfect planar cells. The perfect planar texture was obtained by rubbing in the manner described in the section entitled "Rubbing Parameters" hereafter. Both sides of the cell employed low pretilt DuPont 2555 polyimide alignment material and were rubbed.

The inventive cell that includes only one homogeneous alignment surface, for example, includes large planar domains near the homogeneous alignment surface similar to the large planar domains found in the perfect planar texture shown in FIG. 4, intermingled with smaller planar domains.

The large planar domains are formed near the homogeneous alignment surface in the present invention. In the present invention, regions of the cell may possess large planar domains (e.g., near only one substrate when only one side is rubbed). However, in the case of a cell in which rubbed polyimide homogeneous alignment surfaces are disposed adjacent both substrates, the liquid crystal material of substantially the entire cell, depending upon the thickness of the cell, may include very large planar domains. In this case the texture even more closely resembles the perfect planar texture and may even achieve it as shown in FIG. 4.

The present invention advantageously obtains larger planar domains, and hence a dramatic increase in brightness as a result of this texture, but also has a stable focal conic texture. That is, over time, in the inventive cells the focal conic texture is stable at zero field and the focal conic texture is not believed to revert significantly to the planar texture. This attribute of significantly improved brightness with a stable focal conic state, is not obtained by prior displays. In view of the stable focal conic state, cells made in accordance with the present invention are capable of being used and operated as typical cholesteric liquid crystal displays with electrical components, driving voltages, drive schemes, refresh rates and the like, which are typically used for conventional cholesteric displays.

The focal conic texture influences the contrast of the display. If the focal conic texture is too bright, such as in the case of the conventional cell having only the perfect planar texture, the cell has little commercial usefulness since the images resulting from pixels in the bright planar state would be difficult or impossible to discern from the images resulting from pixels in the very bright focal conic state. We consider the focal conic state to be too bright if its reflectance exceeds 10%.

Cells produced in accordance with the present invention are able to achieve unique properties based upon use and manipulation of the inventive homogeneous alignment surface. The homogeneous alignment surface is typically a rubbed polyimide. The particular type of polyimide, such as the pretilt angle it provides the liquid crystal director, affects the advantageous properties of the inventive displays. The treatment conditions such as the pressure and number of rubs, are also factors in achieving the inventive homogeneous alignment surfaces. The alignment layer materials that are suitable for the various applications and aspects of the invention may vary along with the rubbing conditions. It will be appreciated in view of this disclosure that not every homogeneous alignment surface can produce the features of the present invention. It is well within the purview of those skilled in the art in view of this disclosure to determine which alignment surfaces are suitable, based upon which are able to achieve the increased brightness, decreased focal conic reflectance, and/or increased degree of circular polarization of the present invention.

The rubbing conditions may alter the pretilt angle of the alignment layer materials. For example, a material with an initially high pretilt angle when heavily rubbed may exhibit a decrease in the pretilt angle. A low pretilt angle alignment material, on the other hand, may not have its pretilt angle changed as much by the rubbing conditions. This illustrates the variations that are possible in the selection and treatment of alignment materials.

Those skilled in the art will appreciate that other polyimide alignment layers, other alignment layer materials in general and other hard coat materials, may be employed. For example, two different thicknesses of the same polyimide alignment layer may give significantly different results with or without rubbing. One skilled in the art may empirically determine, in view of the present disclosure, various types of polyimide, SiO or other alignment materials, various combinations of the same or different alignment materials, various thicknesses of alignment materials, various treatments to produce the homogeneous alignment surfaces such as rubbing in the same or different directions, or nonrubbing techniques for providing the homogeneous alignment surface, which are suitable for use in accordance with the principles of the present invention.

Various surface treatments may be used for preferentially orienting the liquid crystal director to form the inventive homogeneous alignment surface. The homogeneous alignment surfaces may be formed using a rubbed alignment layer material such as polyimide, and so as to provide the liquid crystal director with a particular pretilt angle. Another way to provide a suitable degree of homogeneous alignment is by using UV treated alignment layers and irradiating with unpolarized, polarized and/or partially polarized UV light. The invention is preferably directed to alignment control over the spatial extent of a single substrate.

The homogeneous alignment surface is preferably made by rubbing the alignment layer material under various treatment conditions. Generally, "strong" rubbing results in large domains, and the loss of contrast. In the present invention, however, rubbing parameters may be employed that have a "weaker" affect on the alignment layer. This alignment control may be done through methods other than rubbing, including but not limited to: optical alignment techniques, as disclosed in Gibbons et. al., *Nature,* 351, 49 (1991); and Schadt, M. et. al., *Jpn. J. Appl. Phys.,* 7, 2155 (1992), which are incorporated herein by reference in their entireties, printing multiple polyimide layers on the same substrate that are spatially separated or even blending polyimides of different chemistries together. These techniques may provide variations in the optical and electrooptic characteristics of the display.

Other alignment control techniques may be used that require a mask to spatially separate regions of the substrate for optimization of viewing angle, optics, and electro-optics. One such technique is optically controlled alignment shown by the above described Gibbons et al. and Schadt et al. references. The benefits of such alignment control techniques include a touch free process which prevents damage to the alignment layer, and fine resolutions achievable through the use of a mask.

In general, optical alignment techniques use polarized light to obtain an azimuthally preferred orientation. An oblique irradiation of the polarized UV light is then used to generate the pretilt angle. Cholesterics do not necessarily require a strong homogeneity in the azimuthal direction. It is proposed that altering the polarization state will change the pretilt generated and the degree of homogeneity. Controlling the amount of pretilt and degree of homogeneity can provide ways of engineering the homogeneous alignment surface to give desired domain sizes, high contrast and fast relaxation. It is believed that with lighter or less rubbing there is less homogeneity, smaller domains and a lower S3 value, whereas with greater or more rubbing, there is a greater degree of homogeneity, larger domains and a higher S3 value.

It is also proposed that spatially separated polyimides may be printed on a single substrate that have different aligning properties. This will require high resolution printing techniques so that different polyimides can be printed on a single display pixel. The advantage of this technique is that two different polyimides can be selected with appropriate aligning properties. There are disadvantages to this method such as increased process time, lack of high resolution off-set printing equipment and registration concerns.

Another alignment control technique incorporates mixing different polyimides together prior to deposition on the substrate. Their properties may be averaged in this way, and thus appropriate alignment control may be achieved. This technique is advantageous in the sense that no mask is required, and appropriate control may be achieved through simply altering the concentration of the polyimides in the mixture.

The optical textures present in the liquid crystal display may be designed by altering the locations of the homogeneous alignment surface. For example, employing a rubbed polyimide adjacent only one substrate maintains the bistability while increasing the brightness. Employing rubbed polyimides adjacent both substrates of the same cell also maintains the bistability. The cell is predominantly in the perfect planar texture in this case and thus, brightness increases so as to approach 50% (peak). The polarization of the reflected light is preserved as will be described in more detail hereafter, and therefore various optical compensation films such as circular polarizers can be employed to enhance the appearance of the display. Various novel cholesteric displays may thus be designed in accordance with the present invention. The present invention has direct applications where the optics of cholesteric displays need to be modified based on the application and viewing conditions.

Cholesteric liquid crystal displays preferably achieve stability of the focal conic and planar textures according to the present invention through the use of the homogeneous alignment surface rather than with polymer present in the bulk of the liquid crystal. The use of an unrubbed polyimide layer in conventional cholesteric displays introduces defects in the uniform textures, giving them the stability. The defect distribution of conventional unrubbed cholesteric displays and the domain structures are generally uniform over the entire substrate.

In contrast, the defect density and size (as well as domain size and distribution) may be changed according to the present invention by changing the chemistry of the polyimide layer, or even by changing the thickness of the same polyimide, as disclosed in Schlangen, L. et al., *Proc. of Asia Display* 98, 123 (1998), which is incorporated herein by reference in its entirety. It may also be possible to change the influence of the polyimide layer by altering the imidization conditions of the polyimide. This may be possible by altering the curing temperature and/or curing time of the polyimide layer.

Rubbing Parameters

A rubbing process and rubbing parameters suitable for use in the present invention will now be described. These rubbing parameters were employed to produce FIGS. 15–17 that show the S3 measurements, and FIGS. 12–14 that show reflectance curves relating to choice of alignment layer materials. Rubbing of polyimide films is a standard process in the manufacture of twisted nematics (TN's) and super twisted nematic (STN) liquid crystal displays. The rubbing process is performed after the polyimide is coated on the substrate and cured and prior to panel-to-panel assembly. The process involves buffing or rubbing the surface of the polyimide film with a velvet cloth. The rubbed film provides a preferred alignment direction for the liquid crystal molecules. The rubbing process parameters or conditions as well as the chemical characteristics of the polyimide film impact the electrooptical performance of the display.

In the present invention a Rubbing and Dry Cleaning Module manufactured by Hornell Engineering, Inc., Model No. RM400-RR-DC was used. This is a high performance computer-controlled polyimide rubbing tool used in the manufacture of liquid crystal displays.

In operating the machine, the operator enters values for the process parameters via the computer. One set of process parameters that was employed herein was as follows:

TABLE 1 table angle: 0°
table speed: 100 mm/sec
roller angle: 0°
roller speed: 500 rpm counterclockwise rotation
plate thickness: 0.55 mm
table load angle: 0°
roller rub pressure: 0.35 mm
rub direction: forward
roller motor: on with rubbing
number of passes: 1.

Operating the rubbing equipment to produce the properties of the liquid crystal displays of the present invention is well within the abilities of those skilled in the art. Those skilled in the art will also appreciate that the above rubbing parameters may be varied.

Brightness Measurement

Brightness measurements suitable for use in the present invention will now be described. Two general techniques are used for measuring brightness in cholesteric liquid crystal displays: focused detection and collimated detection. The light is illuminated diffusely in both cases.

The reflection from stabilized cholesteric displays is measured using an integrating sphere. The principle of the measurement is that the test pixel is illuminated with diffuse white light and measured at 8° away from the cell normal.

The incident light is normalized to a standard white diffuse reflector. The diffuse standard measures approximately 99% from 400 nm to 700nm. The dark noise of the instrument is subtracted from the data. All optical films are generally removed from the front surface of the test cell. The back is generally painted black. The specular component is also included in all measurements. The brightness measurements of the single layer displays were made by a spectrophotometer by Minolta Co., Ltd, Model CM-508d, calibrated using factory supplied tile #21471020. The measurement with the Minolta device is normalized for standard D65 illuminant. This was not used at all for stacked display measurements.

Figure 5A:
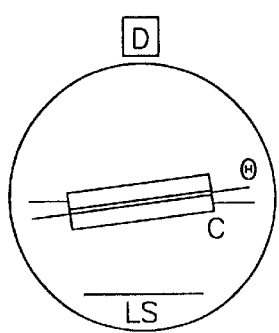
FIG. 5a is a collimated detection apparatus and FIG. 5b is a focused detection apparatus used in brightness measurements in accordance with the present invention, employing an integrating sphere, where D is a detector, C is a cell, LS is a light source and θ is the angle of measurement.
Figure 5B:
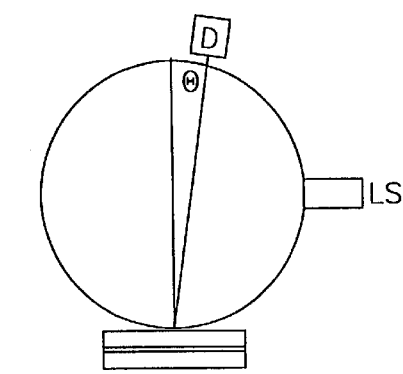
Figure 6:
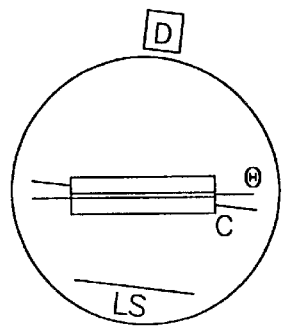
FIG. 6 is a view of an integrating sphere with collimated detection, used in accordance with the present invention for measuring the S3 fourth Stokes parameter, where D is a detector, C is a cell, LS is a light source, and θ is the angle of measurement, set to about 8°.
Figure 19:
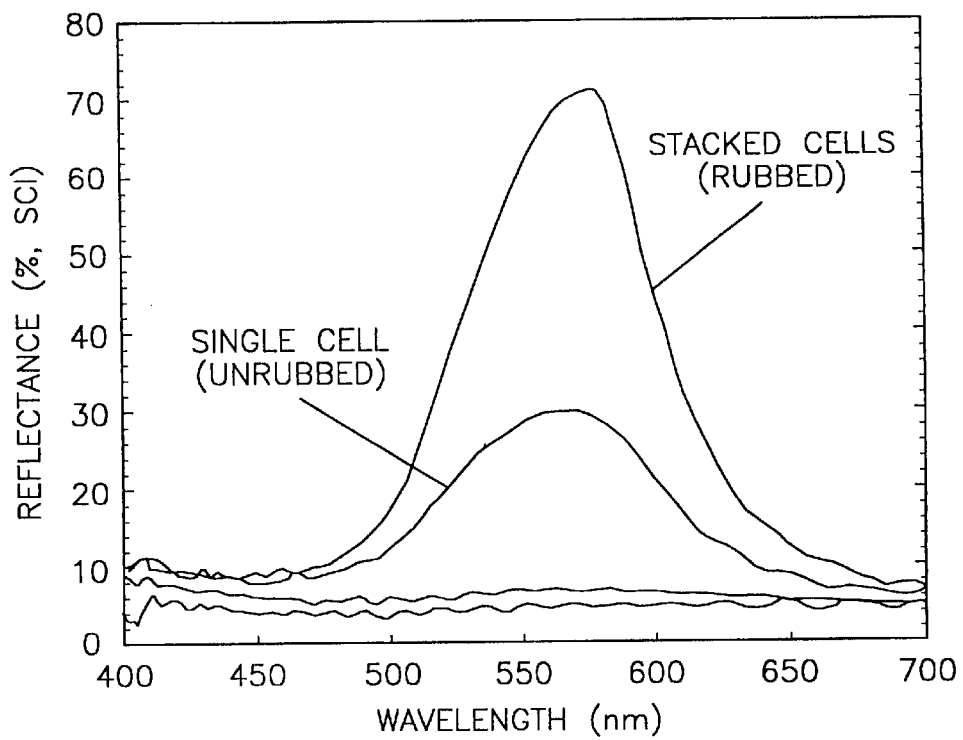
FIG. 19 shows reflection spectra for the stacked cell with three rubbed surfaces, and for the single unrubbed cell.

FIG. 5a shows the measurement setup where a collimated detection is used. The cell is inside the sphere, and the detector is outside. For this measurement θ is 8°. FIG. 5b shows the measurement set-up where a focused detection is used. In this case, the cell is placed outside the integrating sphere, in contact with it. Again, for this measurement θ is 8°. The brightness measurements herein employed the set-up of FIG. 5b in all cases except for the brightness measurements of a stacked display as shown in FIG. 19, which used the set-up of FIG. 5a.

Polarization Measurement

A measurement of S3, the normalized Stokes parameter, suitable for use in the present invention, will now be described. Due to the scattering (diffuse reflectance) nature of reflective cholesteric displays, an integrating sphere was used to carry out the S3 measurement. This ensures that all reflected light is collected.

The normalizations for the right and left circular polarizers are separate in order to compensate for transmission differences between the two polarizers. It should also be noted that the reflection from a perfectly aligned planar cholesteric sample (thickness greater than 3 μm) is completely circularly polarized near the surface normal within the reflection band. However, the S3 value in the reflection band will not be +1 for a right handed material. The reason is the 4% surface reflection from the front glass. This 4% reflection is not circularly polarized. Therefore, the perfect cholesteric texture only reflects 50% of the available intensity, which is 96%. Of this reflected light, 4% is also reflected back into the display. Therefore, only about 46% of the light that reaches the detector is right circularly polarized. This will give an S3 value of about +0.92 instead of +1 for a perfectly aligned cholesteric sample. Therefore, it is to be noted that the maximum degree that reflected light can be circularly polarized results in an S3 value of about 0.92 for a right handed material and −0.92 for a left handed material.

The invention will now be described by reference to the following non-limiting examples.

EXAMPLE 1
Cells Rubbed On One Side

A display was prepared having a homogeneous alignment surface in the form of a rubbed polyimide on only one substrate. The other substrate included an unrubbed layer of polyimide (inhomogeneous alignment surface) and served to stabilize the focal conic texture. The display comprised four separate test cells, each of the test cells including opposing glass substrates separated by 5 μm glass cell spacers (this cell spacing being used in all cells discussed in this disclosure). The arrays were assembled and vacuum filled with the following Merck cholesteric liquid crystal mixture: 75.60% BLO61, 23.90% E44 and 00.50% C6. Disposed on both glass substrates from the manufacturer (Applied Films Corp., T1X0100 in all examples herein) was a hardcoat and ITO electrodes. Applied to this was a Nissan 720 hard coat material for preventing shorting in the well known manner (800 Angstroms "Å" on both sides). On top of this was Nissan 7511 polyimide alignment layer (250 Å on both sides). Each of the test cells included 4 pixels each having a size of 22 mm by 22 mm. The average domain size for the stabilized cholesterics ranged from 3 μm to about 10 μm.

The rubbing parameters for each pixel on one of the substrates is described in the following Table 2.

TABLE 2

| Pixel No. | No. of Rubs | Rubbing Mass (g) |
|---|---|---|
| 0 | 0 | — |
| 1 | 1 | 250 g |
| 2 | 3 | 250 g |
| 3 | 6 | 250 g |
| 4 | 12 | 250 g |
| 5 | 5 | >1000 g |
| 10 | 10 | >1000 g |

Figure 7:
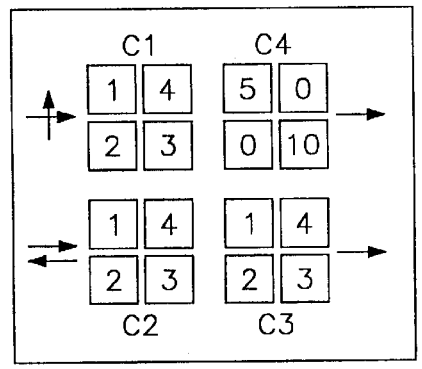
FIG. 7 is a schematic view of cells in which one substrate was unrubbed and the other substrate was rubbed with various rubbing pressure and numbers of rubs, the rubbing directions on the rubbed substrate being shown by arrows.

Each pixel was rubbed differently. All four cells were rubbed on one side only. The arrows in FIG. 7 show the direction of rubs for each pixel of each test cell rubbed according to the parameters shown in Table 2. The pixels were rubbed using a thin plastic mask, which ensured that each pixel is controlled independently. Although the test cell used a mask, to make more homogeneously aligned pixels commercially, the entire substrate may be rubbed such as by using the Hornell rubbing machine. There are four test cells per substrate. The stronger rubs form larger planar domains due to a stronger alignment in the parallel direction. The weaker rubs leave the alignment layer with little azimuthal preference and thus the defect numbers are greater and the size of the planar domains is smaller. In the case of multiple directions of rubbing, the indicated number of rubs were made in alternating directions on the same substrate, represented by arrows in FIG. 7. The two pixels (0) in cell 4 (C4) were unrubbed and serve as the control pixels.

When orienting the array such that the display with the unrubbed polyimide faced the viewer, cells C1, C2 and C3 showed slight changes in textures. In these cells, the planar domains were somewhat larger along the rub direction. The rubbing in orthogonal directions in the cell C1 seemed to cancel each other out. However, this was not the case in the cell C2 where consecutive rubbings were anti-parallel. In the cell C2 the antiparallel rubs seemed to enhance each other. There was very little electrooptical difference between each pixel of these three cells C1, C2 and C3. The peak brightness of the control pixels in cell C4-pixel 0, was about 31%. The peak brightness increased in pixel 4 of cells C1 and C2 to about 33.5%. The brightness gain in pixel 4 of cell C3 was not measurable. The contrast did not change substantially in cells C1, C2 and C3. These rubbed pixels showed a slightly different appearance in the specular direction. Rubbing artifacts were visible with the naked eye.

In contrast, Cell C4, which was produced in accordance with the present invention, showed dramatically different results compared to the other cells. The rubbing mass was much higher on pixels 5 and 10 of cell C4 (5 and 10 rubs at a rubbing mass of greater than 1000 g, respectively). Pixel 0, was used as a control pixel. Due to the fact that the rubbing strength was significantly higher in cell C4, the domain sizes were much bigger.

Figure 8:
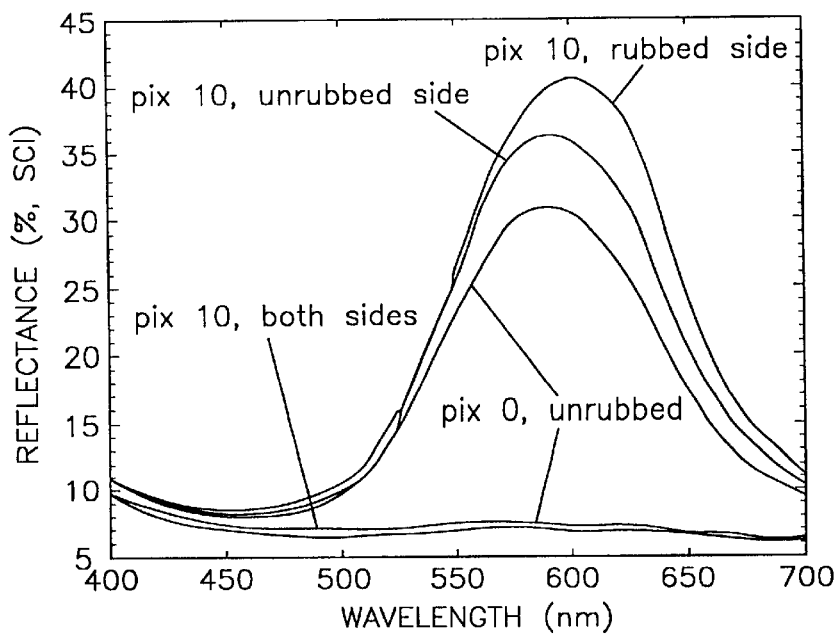
FIG. 8 shows reflection spectra of C4 pixels 10 and 0 from FIG. 7 as viewed from both sides, planar and focal conic.

Photographs of the textures from cell C4 are shown in FIGS. 2 and 3. As a result of the larger domains, the brightness gain was dramatically higher. For pixel 10, the peak brightness as measured with the rubbed side up went up from about 31% to about 41%. This was an increase in peak brightness of about 32% over the unrubbed control pixel. Due to the larger planar domains, the texture when viewed from the rubbed side, appeared shiny or metallic. This is because the larger domains contribute to the specular direction only. Specular reflection, which occurs in the case of the texture with large domains, is to be contrasted with diffuse reflection, which occurs in a typical cholesteric liquid crystal display. The contrast lowers due to the appearance of small planar domains in the focal-conic texture or off state. The reflectance from the planar and focal-conic textures for cell C4 is shown in FIG. 8. Pixel 0 reflectance is also shown for comparison. One focal conic reflectance spectra for pixel 10 is shown in FIG. 8. None of the cells were rubbed on both sides.

It is important to note that contrast is maintained due to the fact that only one substrate is rubbed and the rubbed surface has a high pretilt angle. The unrubbed substrate introduces defects in the texture, giving the planar and focal-conic states their zero field stability.

When the cell C4 is viewed so that the unrubbed alignment layer material is closer to the viewer, the display looks very different as shown in FIG. 3. As discussed above, from this view the larger planar domains appear to be covered by smaller domains. This indicates that the nature of the domain structure was varying significantly along the depth of the display. The helical axis orientation distribution in larger domains was strongly peaked about the surface normal. The helical axis of planar domains in the perfect planar texture is perpendicular to the substrate, which results in high brightness. In cells not in the perfect planar state, a smaller amount of planar domains have their helical axis oriented along the surface normal, resulting in less bright or black regions. The helical axis distribution was wider in the smaller domains as previously shown in Taheri, B. et al., *Proc. of SID* 96, 39 (1996); and Khan et al., *Proc. of SID* 96, 607 (1996), which are incorporated herein by reference in their entireties.

The peak brightness for pixel 10 in the cell C4 from the unrubbed side increased to a value of about 37%. The display did not have a shiny appearance when viewed from this side, and the viewing angle was preserved. The contrast was not lowered as much as when viewing from the rubbed side.

The cells C1, C2, and C3 did not show appreciable differences from when they were viewed from the unrubbed side. The brightness gain was lower. However, the rubbing artifacts that were visible with the naked eyes from the rubbing side were either not present, or were very faint, from the unrubbed side.

It has also been shown that rubbing with a relatively hard pressure results in near ideal domain distribution that enhances brightness. Rubbing parameters and alignment layers may also be used to control the domain distribution. It has also been shown that rubbing the entire substrate without a mask automatically provides a spatially distributed alignment control that can be effectively used to optimize the optics and electro-optics of cholesteric displays. This eliminates the need for a mask. Furthermore, the manufacturing is simple since conventional rubbing techniques are employed. No new equipment is required.

EXAMPLE 2

Cells Rubbed on Both Sides

Figure 9:
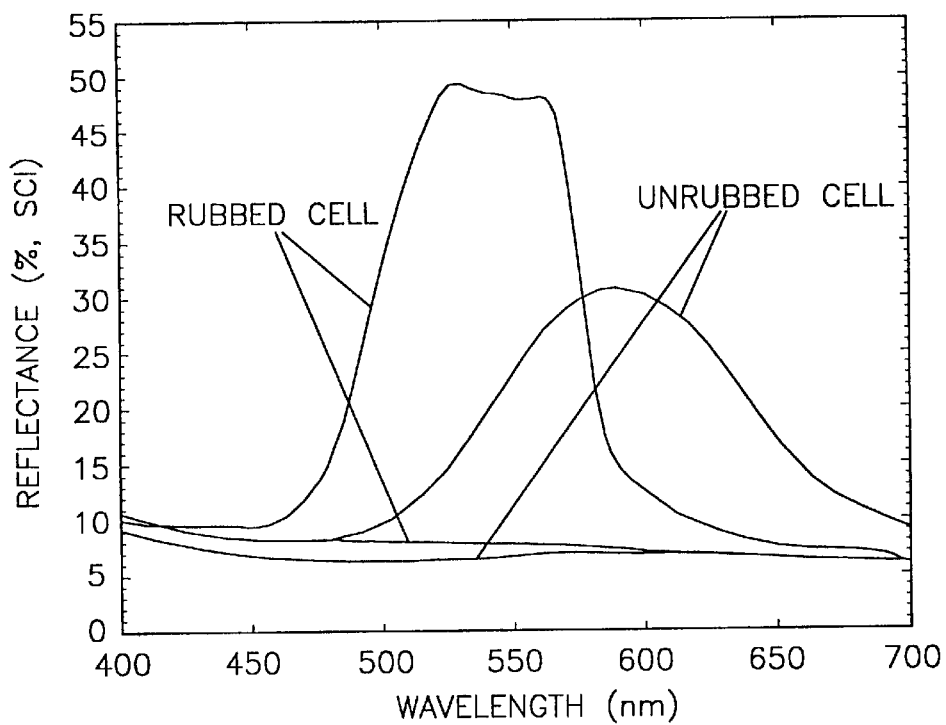
FIG. 9 shows reflection spectra from a cell with rubbed 7511 alignment layer material on both substrates, the reflection from unrubbed 7511 being shown for reference.
Figure 10:
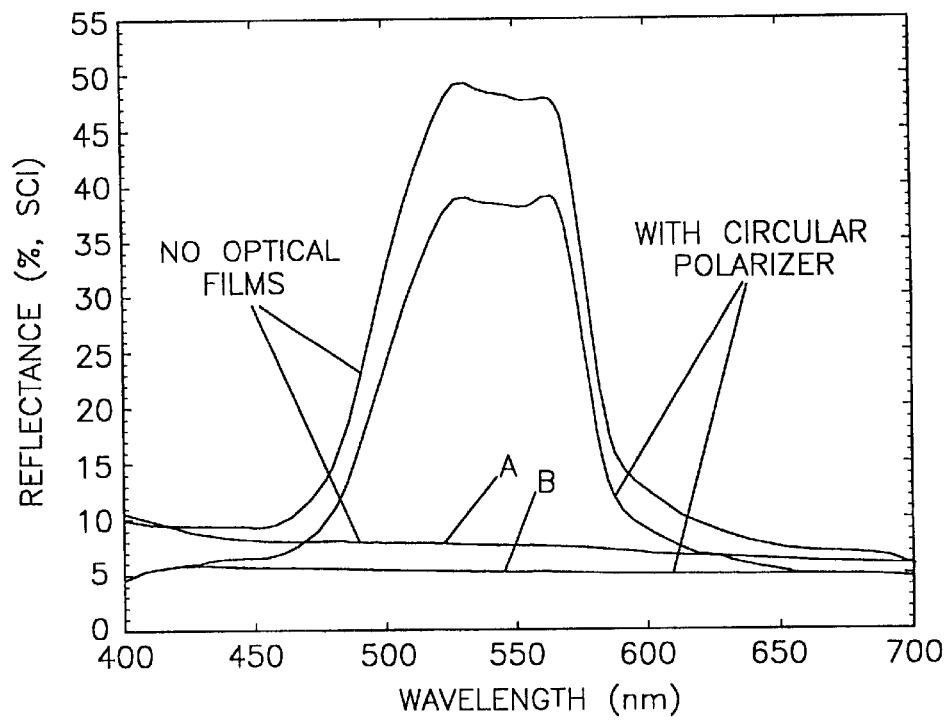
FIG. 10 shows reflection spectra from a cell with rubbed 7511 alignment layer material on both substrates and right handed circular polarizer on the top substrate. Reflection spectra from the same surface without optical films is shown for reference.

Another embodiment of the present invention employs a homogeneous alignment surfaces in the form of rubbed polyimide layers each disposed adjacent one of the substrates. The display comprised opposing glass substrates separated by a 5 $\mu$m cell spacing. The display was assembled and vacuum filled with the following Merck cholesteric liquid crystal mixture: 77.60% BL061, 12.10% E44, 10.0% pcyanopentylbenzene as described in U.S. patent application Ser. No. 08/862,561, entitled "Low Viscosity Liquid Crystal Material", which is incorporated herein by reference, and 00.30% C6, the reflectance curves of which are shown in FIGS. 9 and 10. The unrubbed cell shown in FIG. 9 included 75.6% BL061, 23.9% E44 and 0.50% C6. Disposed on both substrates was Nissan 720 hard coat material (800A on both sides), and on top of this was Nissan 7511 polyimide alignment layer (250 Å). The same substrates with hardcoat and ITO coatings described in Example 1 were used here. Another display was prepared identically except that it included the alignment layer of a thickness of 150 Å. The displays of both thicknesses of alignment layer showed similar results. Only two rubs were made on each substrate. The rubbing strength was light (about 1 kilogram or less) on both substrates, and the rubs were parallel.

The planar texture in the cell had a shiny or "metallic" appearance in view of the fact that the planar domains were very large, with few defects. The focal-conic texture was also stable under zero field conditions. FIG. 9 shows the reflection spectra for the two textures in the cell having both sides rubbed. The reflection from unrubbed surfaces are also shown for comparison. The generally square shape of the reflection band in the planar texture of the rubbed cell is indicative of the perfect planar texture.

In the case of using Nissan 7511 brand polyimide alignment material, lightly rubbed on both sides the same as above, the focal-conic texture was stable without the use of a polymer network in the liquid crystal material. This makes a unique device in the sense that the planar texture is substantially without defects (perfect) and the focal-conic texture was stable. Therefore, a bistable (zero field) cell can be made with a perfect planar texture, and a good focal-conic texture (low back scattering).

There are numerous advantages to the perfect planar texture, including high reflectivity, a peak brightness that approaches 50%, a unique appearance, and a known polarization state of the reflected or transmitted light. The preservation of the polarization state of the reflected light enables the use of other methods of optical compensation and contrast enhancement. However, there is a sacrifice in the view angle compared to conventional surface stabilized rubbed cholesteric liquid crystal displays, and the metallic appearance of the planar texture may be undesirable in some cases.

A polarizer may be laminated on top of the display rubbed on both sides resulting in a dramatically higher contrast display. In a double stacked cell display, a circular polarizer may be disposed on one cell or between the cells. When a liquid crystal material having a right handed twist sense is used, the polarizer is a right handed circular polarizer. Reference to the twist sense of the cholesteric liquid crystal material indicates that the material reflects incident light having a polarization of the same sense. That is, a liquid crystal material having a right handed twist sense reflects right handed polarized incident light and does not reflect left handed polarized incident light. Light reflected from the inventive liquid crystal exhibits a significant increase in a peak degree of circular polarization of light reflected from the planar texture, such that it may even be circularly polarized (e.g., S3 value of 0.92). Light that transmits through the polarizer into the display is polarized with a particular twist sense (e.g., right handed). Only right handed elliptically polarized light is then transmitted from the display through the polarizer. All of this transmitted light that is within the reflection bandwidth of the cholesteric is reflected by the liquid crystal material, transmitted through the polarizer and back to the viewer as right handed circularly polarized light. Since the light that is reflected by the planar texture of the liquid crystal material is circularly polarized with the same twist sense as the polarizer, the reflected light thus passes through the polarizer.

FIG. 10 shows the reflection spectra of the rubbed cell with the circular polarizer. It can be seen that the reflection of the focal-conic texture is lowered from about 7% (reference A) without a polarizer to about 4.75% (reference B) when the polarizer is used. A reflectance of about 4% typically results largely from the index mismatch at the air/polarizer or air/glass interface. The difference between the focal conic reflection of 7.0% without polarizer and the 4.0% due to reflection back from the air/glass interface, is about 3.0%. Reducing the effect of the 3.0% reflectance value by about 75% due to the use of the right handed polarizer, right handed liquid crystal and large planar domains, gives a reflectance of about 0.75%. Adding the 4.0% due to the air/polarizer interface and the 0.75% value gives about 4.75%, which is consistent with the reflectance B shown in FIG. 10. Since there are no crossed polarizers, there is no additional reduction in the view angle due to the polarizer. The invention therefore enables a much higher contrast and higher brightness than in a conventional display.

In contrast to conventional cholesteric displays, where the use of a polarizer would lower contrast, the large planar domains of the present invention enable substantially all of the light that can be reflected from the cholesteric material of a certain twist sense, to be reflected when the polarizer is matched with the twist sense of the cholesteric material. The polarizer also prevents backscattered light from reaching the viewer. This advantageously enables the polarizer to be used with the liquid crystal display so as to improve contrast.

Figure 11:
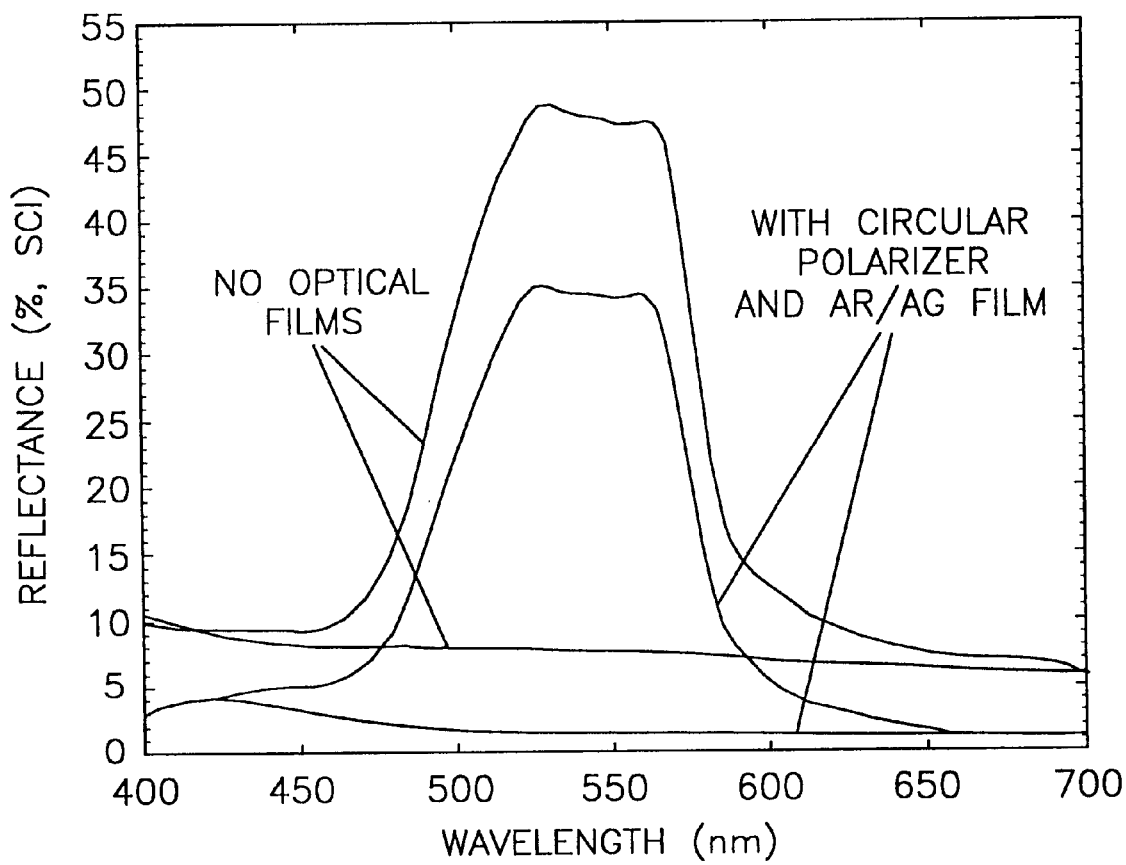
FIG. 11 shows reflection spectra from a cell with rubbed 7511 alignment layer material on both substrates, right handed circular polarizer on the top substrate and AR/AG film on top of the circular polarizer. Reflection spectra from the same surface without optical films is shown for reference.

Addition of an anti-reflection/anti-glare (AR/AG) film on top of the polarizer dramatically improves the performance of the display as shown in FIG. 11. An AR film is used in some displays (e.g., TN or STN active matrix displays) to reduce reflection from the air/glass or air/polarizer interface. By addition of an AR film, the reflection due to the air/glass or air/polarizer interface, e.g., 4.0%, is reduced, which further darkens the image of pixels in the focal conic state compared to the display of FIG. 9. The AG part of the film tends to scatter the reflected components from the planar texture. This results in an improved viewing cone for the display. There is a slight loss in the intensity level at each particular angle due to the distribution of the reflected light over a wider viewing angle. This intensity loss in the reflection of the planar texture can be seen in FIG. 11. It should be noted that the peak brightness is still at 35%, which is higher than the unrubbed cell. The AR and AG films further reduce the amount of reflected light from the focal-conic texture. The AR coating reduces reflection from the surface enough to make the contrast comparable to conventional TN displays with crossed linear polarizers. FIG. 11 shows the focal-conic reflection is less than 2%.

EXAMPLE 3
Alignment Layer Materials

Figure 12:
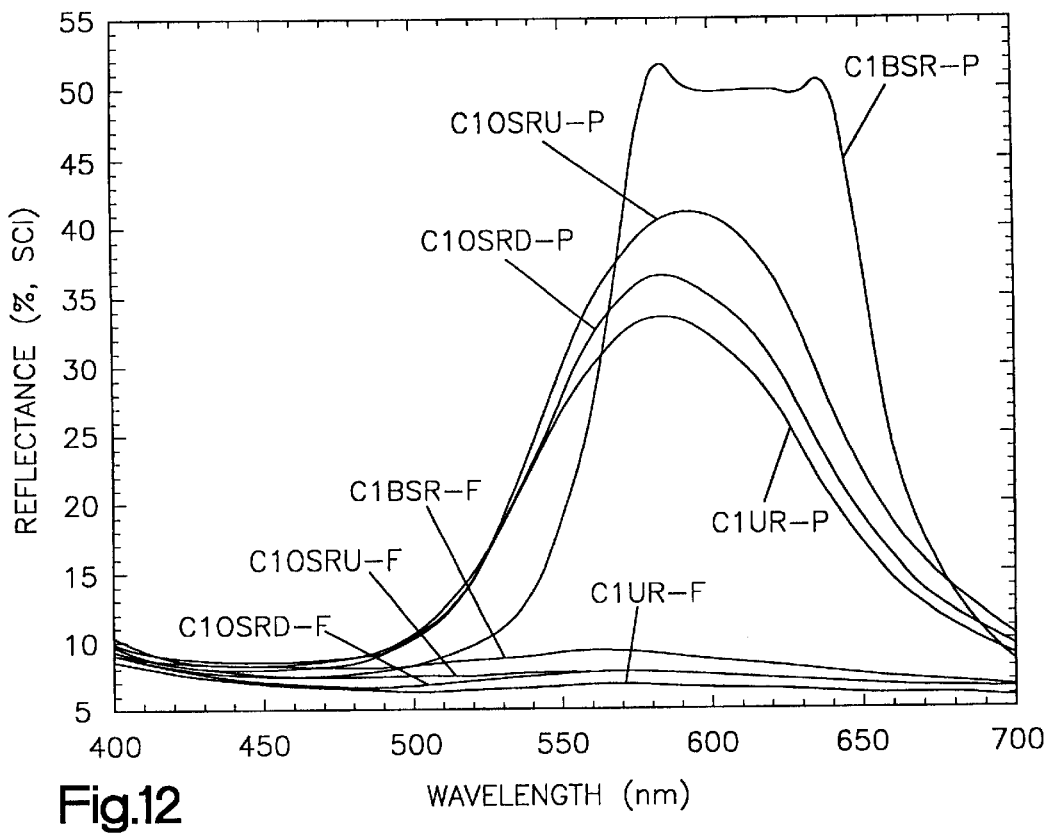
FIGS. 12–14 are reflection spectra for cells using Nissan 7511, Nissan 5211 and DuPont 2555 alignment layer materials, respectively, for cells with both sides rubbed, one side rubbed as viewed from both the rubbed and unrubbed sides, and for an unrubbed cell.
Figure 13:
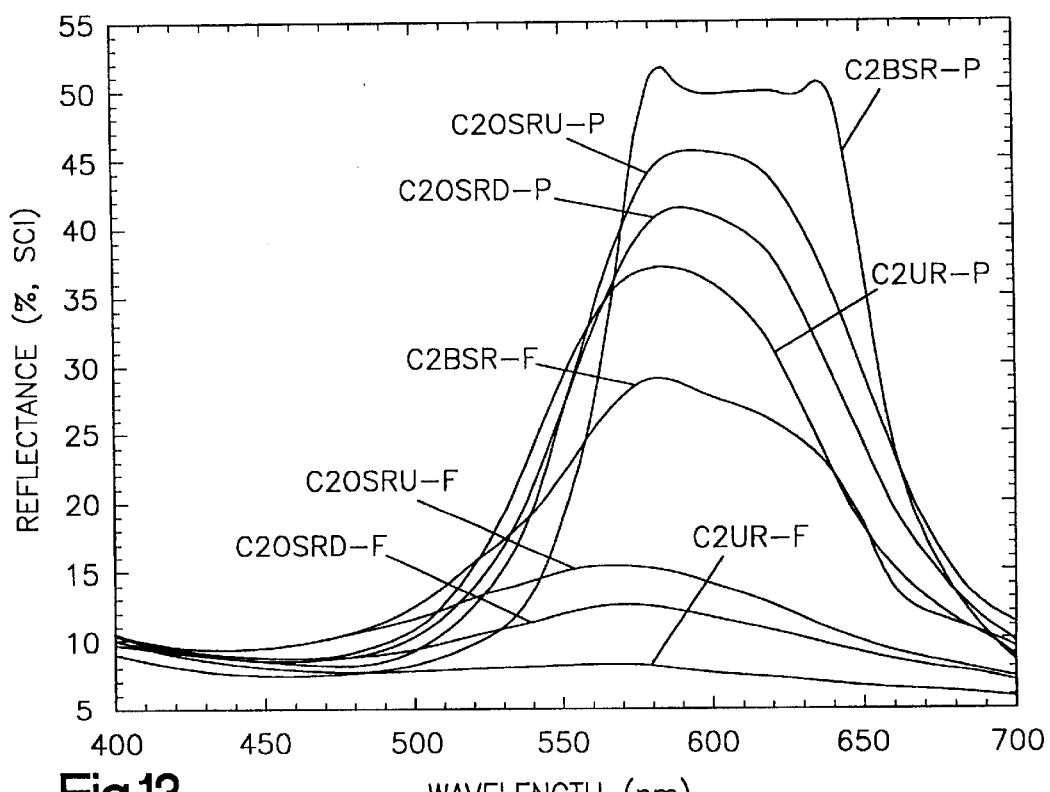
Figure 14:
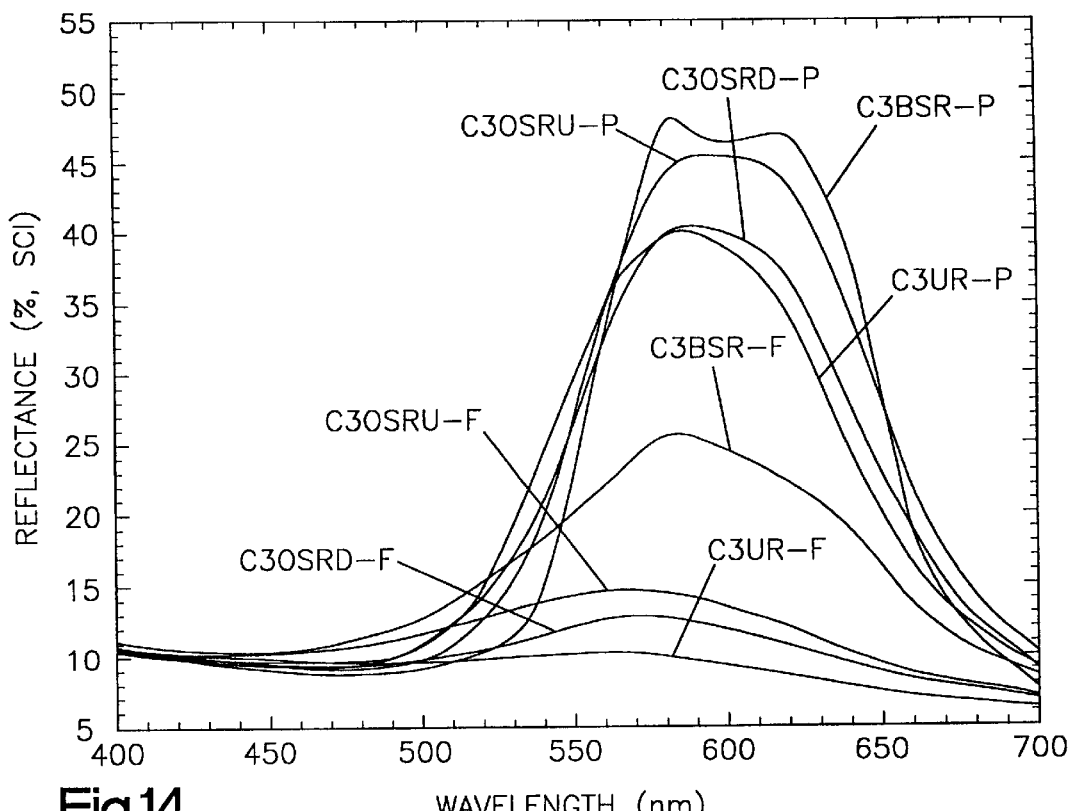

Three types of cells were prepared each with a different alignment layer material, Cells 1, Cells 2 and Cells 3. All of Cells 1 were prepared with Nissan 7511 polyimide alignment material, all of Cells 2 were prepared with Nissan 5211 polyimide alignment material and all of Cells 3 were prepared with DuPont 2555 polyimide alignment material. Three cells were prepared using each type of alignment layer material for a total of nine cells. In FIGS. 12–17, for each type of alignment layer material there was prepared one cell having both sides unrubbed (e.g., "$C1_{UR}$-P"), one cell having one side rubbed and one side unrubbed (e.g., "$C1_{OSR}$U-P") and one cell having both sides rubbed (e.g., "$C1_{BSR}$-P"). Portions of these designations are underlined in the text for emphasis and are not underlined in the drawings. In the figures, cells rubbed on only one side were provided with further designations regarding whether the rubbed side was up ("U") or down ("D") (e.g., $C1_{OSRU}$-P). That is, if the cell was rubbed on one side with the rubbed side up or nearer to the viewer, the unrubbed side was down or away from the viewer and vice versa. In the case of all cells the figures designate whether the spectra was of the planar ("-P") or focal conic ("-F") texture (e.g., $C1_{OSRU-F}$). The effects of alignment layer material on reflectance of Cells C1, C2, and C3 are shown in FIGS. 12–14, respectively. All of these cells were produced with the rubbing conditions described in the section entitled "Rubbing Parameters." All of the cells in FIGS. 12–17 employed the following composition (% by weight): 75.6% BL061, 23.9% E44, 0.5% C6.

The reflectance for the cells having both sides rubbed was the highest for all of the alignment layer materials with regard to the other rubbing conditions, and was about 50% SCI (specular component included) for the Nissan 7511 and Nissan 5211 alignment layer materials of Cells C1 and C2. The focal conic reflectance of the Nissan 7511 C1 cells was much lower than for the Nissan 5211 C2 cells and the DuPont 2555 C3 cells. In the case of the C2 and C3 cells, the focal conic reflectance of the cells having both sides rubbed exceeded 20%, whereas the focal conic reflectance of the C1 cell under all rubbing conditions was less than 10%. Thus, the contrast of the $C1_{BSR}$ cell was much better than the contrast of the $C2_{BSR}$ and $C3_{BSR}$ cells. This illustrates the dramatic effect of the choice of alignment layer material on cell contrast.

In the case of cells having both sides rubbed that are produced in accordance with the present invention, it is especially preferred to select a high pretilt alignment layer material such as Nissan 7511 alignment layer material. A high pretilt alignment layer material that provides the liquid crystal director with a pretilt angle of at least 10° is preferably used for cells in which both sides are rubbed. This provides high contrast for these cells.

Display configurations may use the Dupont 2555 polyimide, such as by placing Nissan 7511 on one substrate and DuPont 2555 on the other substrate of a cell. This way, the DuPont 2555 alignment layer can serve to improve the brightness of the planar texture, while the Nissan 7511 layer may provide improved contrast. As before, depending on which side the display is viewed, either the contrast or the brightness of the display, may be enhanced.

It is believed to be well within the ability of those skilled in the art to determine various alignment materials that are suitable for use in the present invention. It is shown herein that selection of alignment layer material based upon degree of pretilt influences the various properties of the inventive cells.

EXAMPLE 4
S3 Measurement

Figure 15:
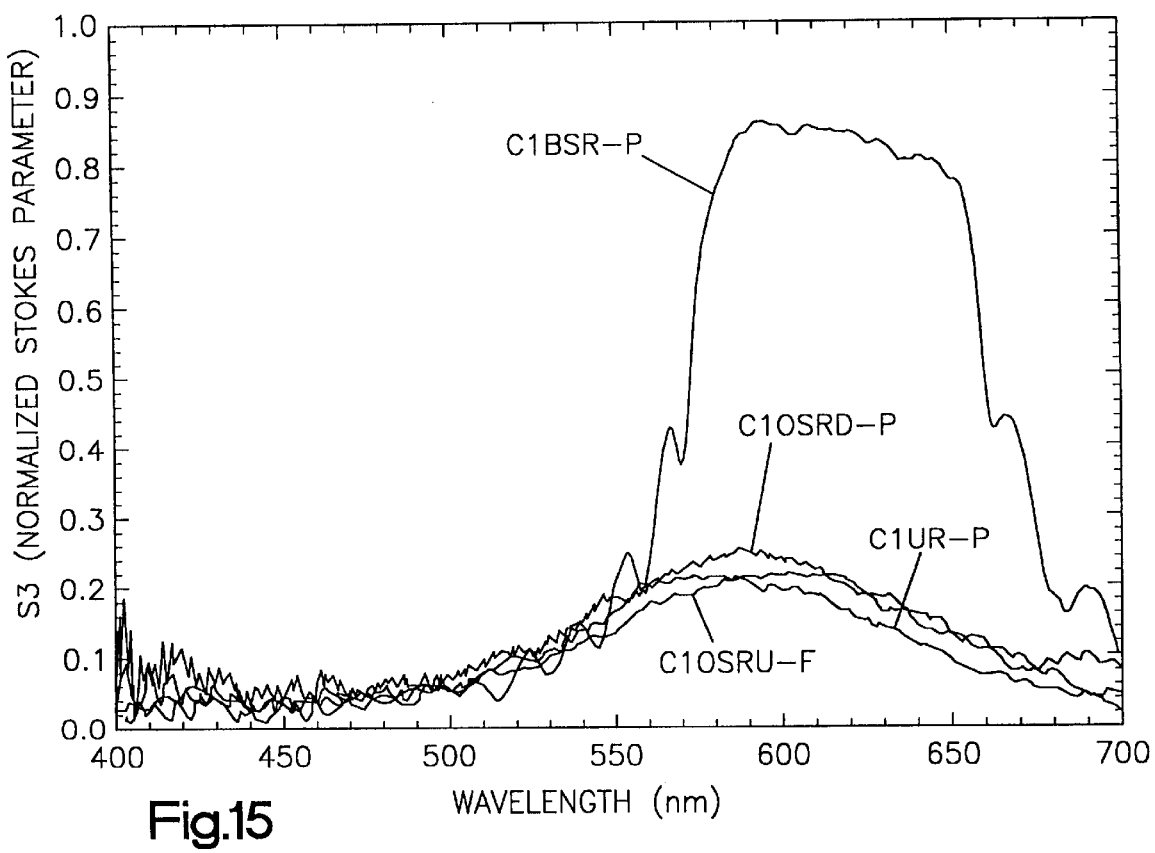
FIGS. 15–17 are graphs of S3 (normalized Stokes parameter) as a function of wavelength for cells using Nissan 7511, Nissan 5211 and DuPont 2555 alignment layer materials, respectively, for cells with both sides rubbed, one side rubbed as viewed from both the rubbed and unrubbed sides, and for an unrubbed cell.
Figure 16:
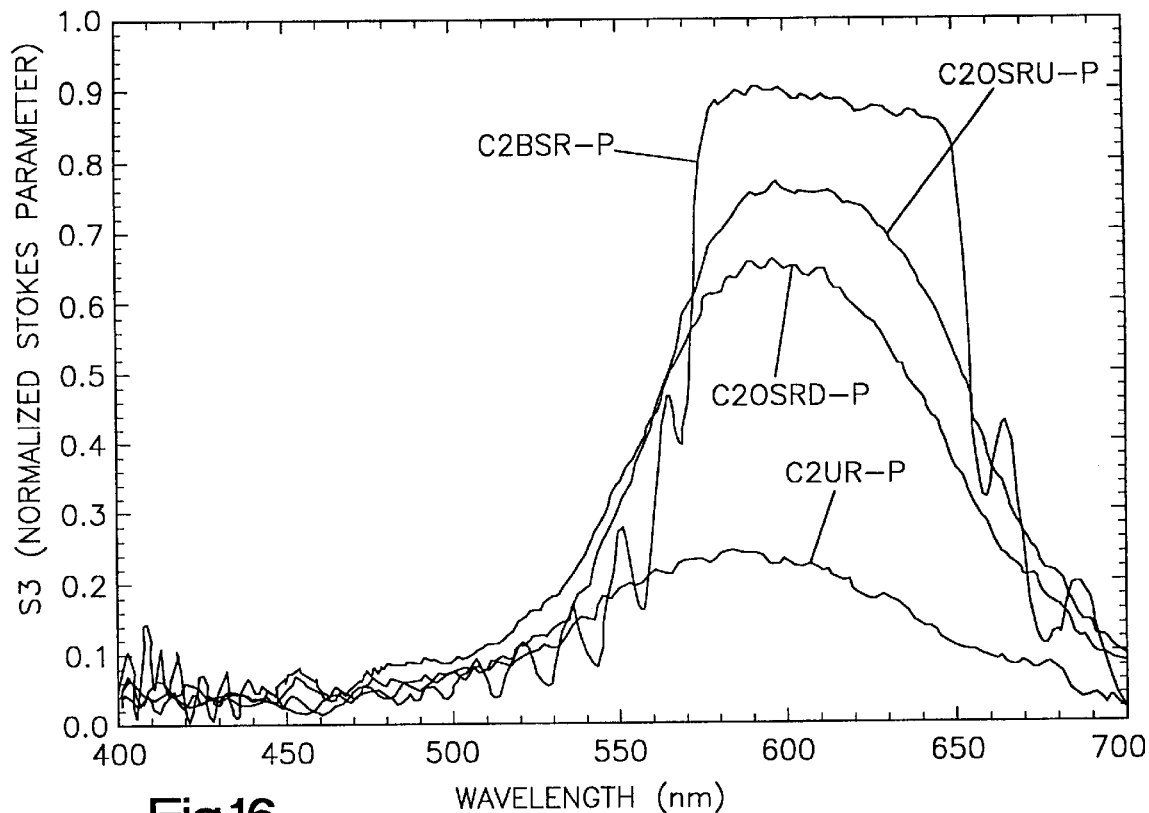
Figure 17:
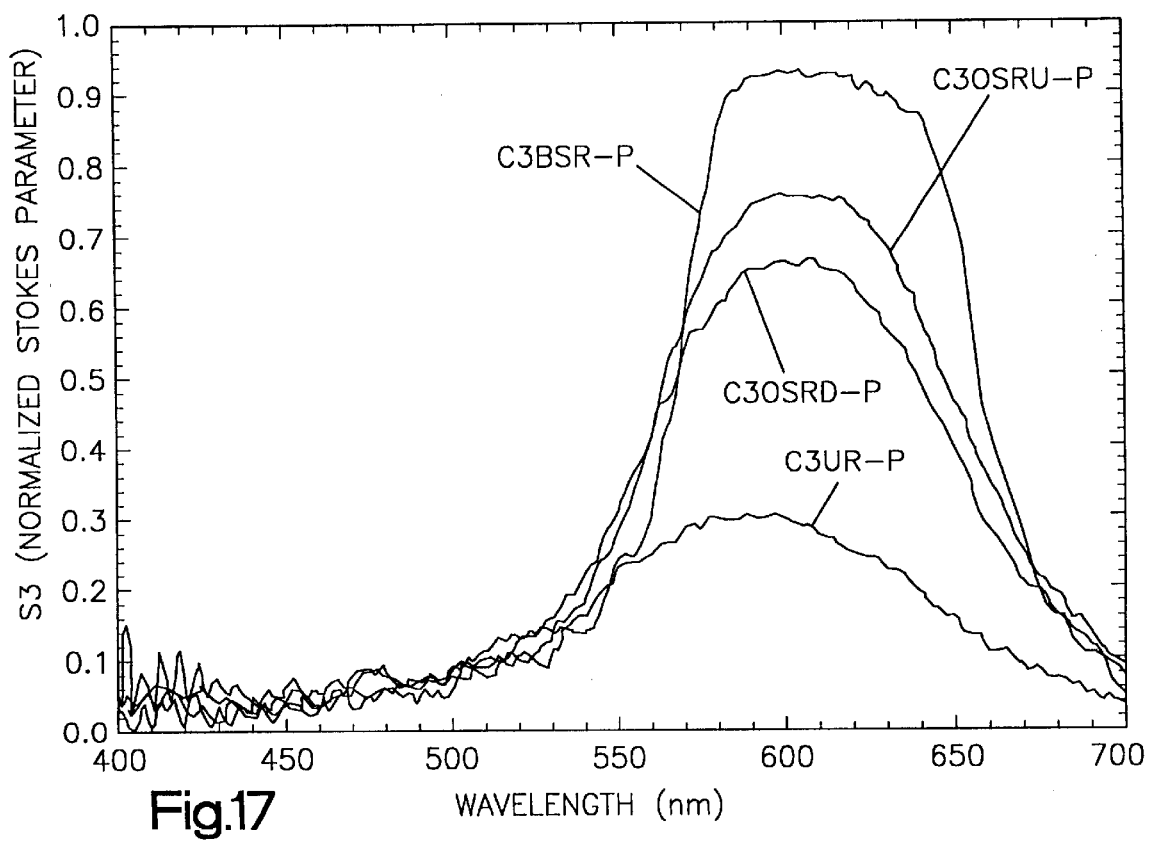

The cells identified in Example 3 were tested for the degree of circular polarization of the reflected light as defined by S3, the normalized Stokes parameter. FIG. 15 shows the results for the C1 cells employing the Nissan 7511 alignment layer material. FIG. 16 shows the results for the cells C2 employing the Nissan 5211 alignment layer material. FIG. 17 shows the results for the C3 cells employing the DuPont 2555 alignment layer material. As shown in FIG. 15, the reflection from the stable planar texture of the cell rubbed on both sides $C1_{BSR}$ had a high degree of circularly polarization with an S3 value of at least about 0.8. The $C1_{OSR}$ cell did not have a much higher degree of circularly polarized light than the unrubbed cell $C1_{UR}$.

As can be seen in FIG. 16, for the C2 cells using the Nissan 5211 alignment layer material, the reflected light from cell $C2_{BSR}$ had a high degree of circular polarization with an S3 value exceeding 0.84. The degree of circular polarization of reflected light from the cell $C2_{OSR}$ was much higher than in the $C1_{OSR}$ cell from both sides of the cell. The degree of circular polarization from the rubbed side ($C2_{OSRU-P}$) exceeded that from the unrubbed side ($C2_{OSRD-P}$).

As can be seen in FIG. 17, in the case of the C3 cells employing DuPont 2555 alignment layer material, the degree of circular polarization from the $C3_{BSR-P}$ cell was very high, with an S3 value greater than 0.92. This S3 value approaches the maximum possible value of degree of circular polarization for a cholesteric cell. FIG. 17 shows that the degree of circular polarization of the reflected light from the sides of the cell $C3_{OSRU-P}$ and $C3_{OSRD-P}$ was good, with the degree of circular polarization from the rubbed side ($C3_{OSRU-P}$) exceeding that from the unrubbed side ($C3_{OSRD-P}$).

The above results indicate that the selection of alignment layer material and rubbing conditions may strongly influence the electrooptical performance of the cell. The Nissan 7511 polyimide alignment material has a high pretilt angle of about 21° from the substrate. A high pretilt angle alignment layer material is believed to be especially suited for use in a cell in which both sides are rubbed. The high pretilt polyimide $C1_{BSR}$ cell had very high reflectance in the planar state and very low reflectance in the focal conic state, resulting in very good contrast. In addition, the reflected light had a high degree of circular polarization. The cell having both sides rubbed has a relatively narrow viewing angle, however. The low pretilt alignment materials used in cells C2 (1 degree pretilt) and C3 (3 degree pretilt) rubbed on both sides, had very high focal conic reflectance, and were less suitable than the Nissan 7511 for making cells rubbed on both sides.

All three of the alignment layer materials may be suitable for forming cells having one rubbed side and one side with an inhomogeneous alignment surface. The Nissan 7511 polyimide cell ($C1_{OSRU-F}$, $C1_{OSRD-F}$) had the lowest focal conic reflectance, less than about 8% reflectance. The DuPont 2555 polyimide cell ($C3_{OSRU-F}$, $C3_{OSRD-F}$) and the Nissan 5211 cell ($C2_{OSRU-F}$, $C2_{OSRD-F}$) had less than 16% focal conic reflectance. It is apparent that while the Nissan 7511 $C1_{OSR}$ cell had the best contrast, it had the lowest degree of circular polarization. The $C2_{OSR}$ and $C3_{OSR}$ cells, on the other hand, had lesser contrast than the $C1_{OSR}$ cell, but good brightness and a high degree of circular polarization. Based upon the foregoing, it will be apparent that one skilled in the art utilizing this disclosure may tailor a cell to a particular application based upon features including rubbing conditions and selection of the alignment layer materials.

One may use any combination of the Nissan 7511, the Nissan 5211 or the DuPont 2555 polyimides alignment layer materials on various sides of a cell or various cells of a stacked display. Similarly, in the case of stacked cell displays, which will be explained in more detail hereafter, the $C1_{BSR}$ cell may be used as the cell further from the viewer. Stacked above this cell may be the $C2_{OSR}$, $C1_{OSR}$ or the $C3_{OSR}$ cell with the unrubbed side being closest to the viewer. Selection of the alignment layer material for the cell that is rubbed on only one side, is dependent upon empirically determining a balance of features including contrast, brightness, and degree of circular polarization, variations of which would be apparent to one skilled in the art in view of this disclosure.

EXAMPLE 5
Stacked Displays

Stacking two cholesteric cells will generally increase the brightness of the planar state of the display. When two conventional cells are stacked on top of each other with approximately the same pitch length, the total peak reflection may increase to about 50%. A single conventional cholesteric cell reflects about 38% peak reflectance, for example. However, stacking two such cells does not result in twice the peak brightness or 76% peak reflectance. The reason for this in the case of top and bottom cells having right and left handed twist sense materials, respectively, is that the defects in the planar texture of the top cell disrupt the polarization state of the light. Therefore, only part of the light is right hand circular polarized and is reflected from the upper cell. An amount of light substantially less than the available incident light reaches the bottom cell. Only a portion of the light that reaches the bottom cell is left hand circular polarized and can be reflected back from the bottom cell. For arrangements of substrates, materials and electronics that are suitable for producing stacked displays, U.S. patent application Ser. No. 08/823,329, entitled "Display Device Reflecting Visible and Infrared Radiation," is expressly incorporated herein by reference.

Using rubbed substrates greatly enhances the brightness in the case of a stacked cell display according to the present invention. In the case of an inventive cell having the large planar domains, the polarization state of incident light is preserved upon reflection from or transmission through the display. Therefore, stacking two cells of opposite chirality may produce a display having a peak brightness that approaches 100% (as can stacking two cells with the same twist sense separated by a half wave plate). Such a double cell stacked display may be monochrome. A stacked display may be produced using as the homogeneous alignment surface, rubbed polyimide layers each disposed adjacent one of the substrates. When the inhomogeneous polyimide alignment surface is closer to the viewer than the rubbed polyimide layer in the upper cell and the lower cell includes rubbed polyimide adjacent each of the substrates, the viewing angle of the display is increased, and the shiny metallic (highly specular) reflection appearance due to the lower cell having both sides rubbed, is eliminated.

Figure 18:
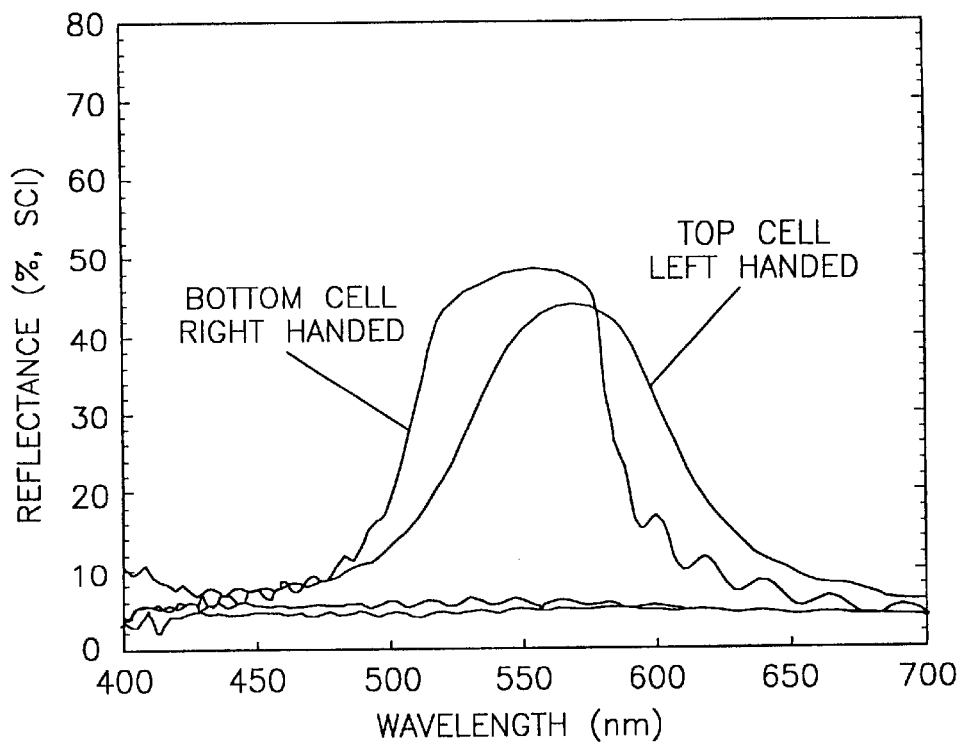
FIG. 18 shows reflection spectra of both planar and focal-conic textures for two cell to be stacked.

FIG. 18 shows the reflection spectra of the two individual cells used in the stacked display described above. The left handed liquid crystal material in FIGS. 18 and 19 comprised 68.99% E44, 4.13% S1011, 10.79% S811, 10.79% C15, 5.0% p-cyanopentylbenzene, and 0.30% C6. The right handed liquid crystal material in FIGS. 18 and 19 comprised 77.6% BL061, 21,1% E44, 10.0% p-cyanopentylbenzene, and 0.30% C6.

A second or bottom cell includes alignment layers that are each disposed adjacent one of the substrates, and includes, a right handed cholesteric material. The cell is rubbed on both sides to produce the large planar domain texture and a bistable cell. The peak reflection of this cell is about 50% as expected from a perfect planar texture (i.e., the reflected light from the liquid crystal of the second cell is right handed and nearly completely circularly polarized). A first or top cell includes only one rubbed alignment layer substrate and is positioned so that the unrubbed side is up. This cell includes a left handed cholesteric material. The peak reflection of the first cell is above 40%, and has a lesser brightness than the lower cell since only one side is rubbed. However, the appearance of the upper cell is similar to that of an unrubbed cell. The reflection from the focal-conic texture of each of the cells is also shown in FIG. 18.

When the first and second cells are stacked, the peak brightness is approximately 72% as shown in FIG. 19. The reflection from a single unrubbed cell is also shown for reference. The high brightness of the stacked cell is due to the fact that the polarization state is preserved upon reflection from the bottom cell which has large planar domains. The focal-conic reflection is higher for the stacked cell display as expected. In FIG. 18 the higher focal conic reflectance curve is from the right handed cell while the other is from the left handed cell. In FIG. 19 the higher focal conic reflectance curve is from the stacked cell, while the other is from the single cell.

Stacked cells having many variations may be produced in accordance with the present invention. For example, a preferred stacked cell display has both sides of the bottom cell rubbed and only the bottom side of the top cell rubbed as described above. However, stacked cell displays made in accordance with the present invention may have both sides of the bottom cell rubbed with no sides of the top cell rubbed, or only a bottom side of both the top and bottom cells rubbed, as well as with other variations of treatment conditions, alignment layer materials, use of polarizers and optical layer materials such as AG/AR materials, as would be appreciated by those skilled in the art in view of this disclosure.

EXAMPLE 6
Stacked Color Displays

The present invention may also be used in stacked multi-color displays. With a double or a triple stacked system (i.e., two or three stacked liquid crystal cells), it is possible to greatly increase the brightness and color purity of the display. By rubbing appropriate substrates in the stacked system, substantially higher brightness can be achieved as shown for the monochrome double stacked system.

The fabrication and operation of stacked color displays would be apparent to those skilled in the art in view of this disclosure and in view of the Ser. No. 08/823,329 application, entitled "Display Device Reflecting Visible and Infrared Radiation," which is expressly incorporated by reference for its disclosure of stacked color displays and the use of grey scale alone and with stacked color displays, inclusive of other references incorporated by reference therein.

Figure 20:
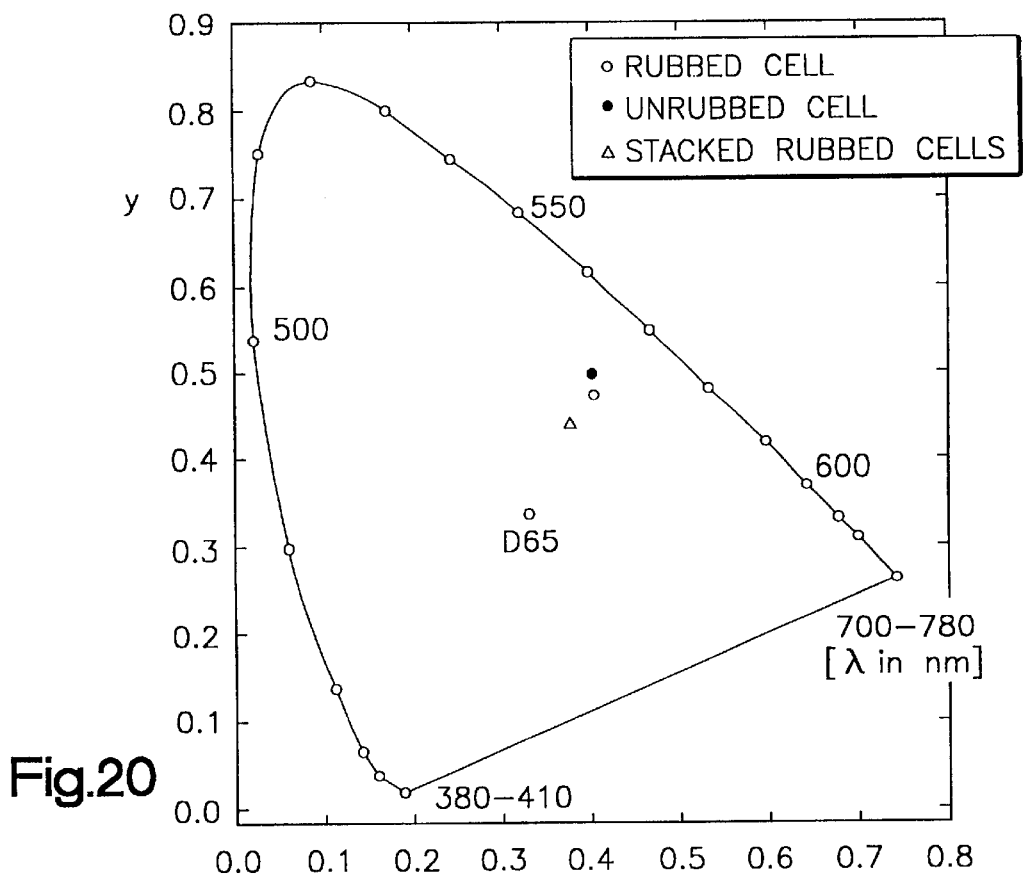
FIG. 20 is a graph showing chromaticity coordinates for rubbed and unrubbed cells, also showing the color coordinates for the double stacked cells.

Due to the fact that rubbed surfaces change the distribution of the helical axes, the reflection spectrum of the planar texture is substantially different. The reflectance is higher (increased brightness) and the width ($\Delta\lambda$) does not change appreciably. This results in a more saturated appearance of the color. This is shown in FIG. 20, where the CIE color coordinates for two different cells are shown. The rubbed cell shown in FIG. 20 was measured from the unrubbed side and had the following composition (% by weight): (left handed material)—68.99% E44, 4.13% S1011, 10.79% S811, 10.79% C15, 5.0% p-cyanopentylbenzene and 0.30% C6. The unrubbed cell shown in FIG. 20 had the following composition (% by weight): (left handed material)—68.99% E44, 4.13% S1011, 10.79% S811, 10.79% C15, 5.0% p-cyanopentylbenzene and 0.30% C6. For the stacked rubbed cells shown in FIG. 20, one cell had the following composition (% by weight): (left handed material)—68.99% E44, 4.13% S1011, 10.79% S811, 10.79% C15, 5.0% p-cyanopentylbenzene and 0.30% C6. The other cell of the stacked cells had the following composition (% by weight): (right handed material)—77.6% BL061, 12.1% E44, 10.0% p-cyanopentylbenzene, and 0.3% C6. The color saturation is considered higher when the color coordinate is closer to the edge of the CIE chart (further away from the D65 white point). In FIG. 20, the rubbed cell is rubbed on only one side, and measured from the unrubbed side. Therefore, the appearance of the texture is similar to that of an unrubbed surface.

The color coordinates for the double stacked system are also shown, where the color saturation increases even further. This is due to the fact that the peak brightness has substantially increased (see FIG. 19) without a substantial increase in the width of the reflection spectrum.

EXAMPLE 7
Electro-optics. Grey Scale and Drive Voltage of Rubbed Cells

Figure 21:
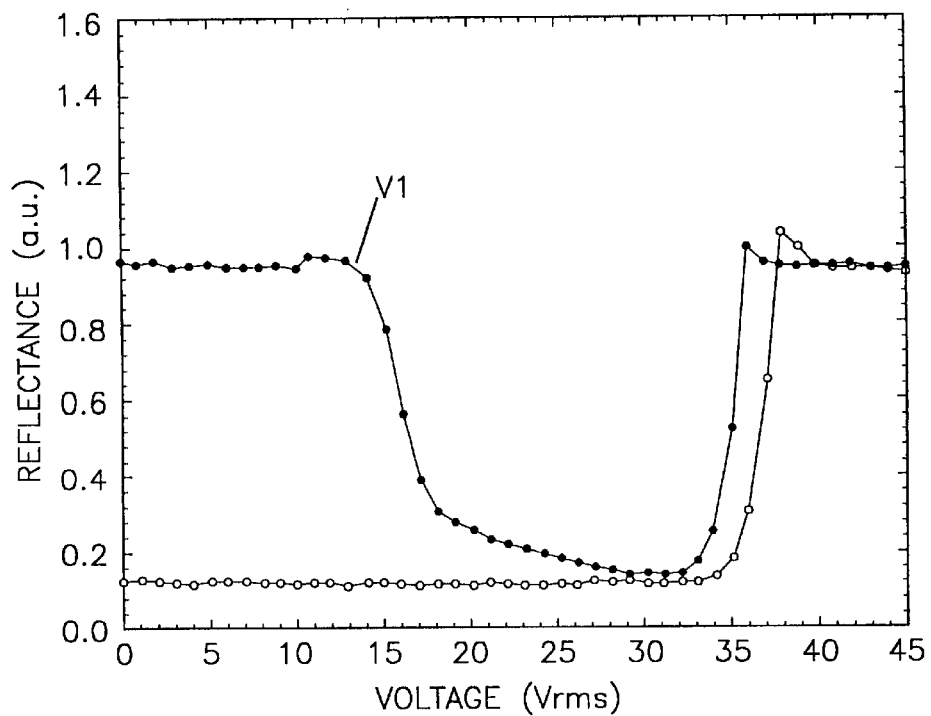
FIG. 21 is a graph of the electro-optical response for a cell with rubbed 7511 alignment layer material on both substrates with a threshold (V1=14V)
Figure 22:
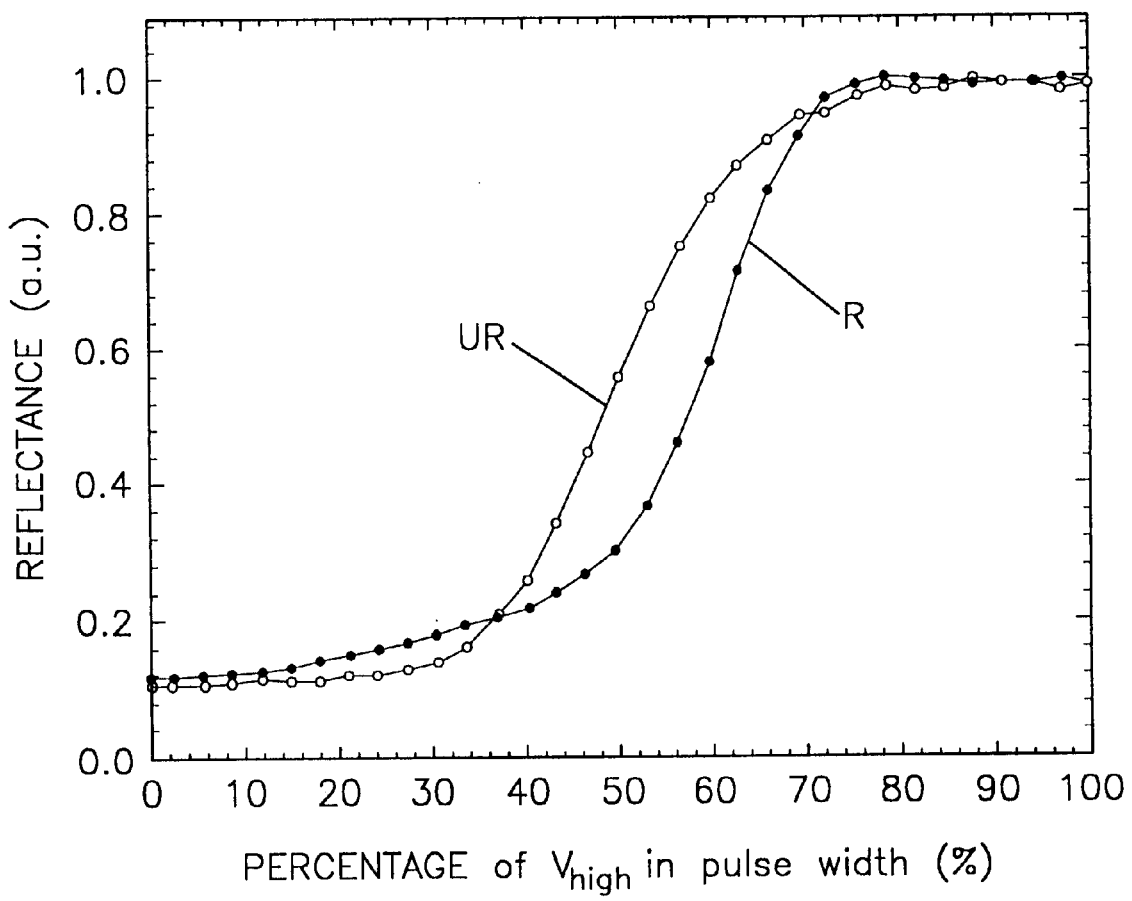
FIG. 22 is a graph of grey scale response for a cell with rubbed 7511 alignment layer material on both substrates, wherein the grey scale drive method is pulse width modulation.

In general, the electro-optical performance of the inventive rubbed cells (one side rubbed, and both sides rubbed) shows comparable behavior as that of unrubbed cells. A threshold voltage V1 is obtained as shown in FIG. 21. This threshold voltage V1 enables multiplexing high resolution displays. The liquid crystal compositions for the materials shown in FIGS. 21 and 22 is as follows (% by weight): 75.6% BL061, 23.9% E44, 0.50% C6. FIG. 21 shows the electro-optical response measured for a cell rubbed on both sides. This curve is essentially the same as that for unrubbed cells.

It is also shown that grey levels are also infinitely stable under zero field conditions. Grey scale can be controlled by controlling the magnitude of the driving pulse, i.e., by pulse amplitude or pulse width modulation, as disclosed in U.S. Pat. No. 5,453,863 to West et. al, which is expressly incorporated herein by reference in its entirety, especially for its disclosure of grey scale. Grey scale may also be obtained herein by other methods such as through homeotropic alignment and gradual removal of the electric field, as disclosed in U.S. Pat. No. 4,097,127 to Haas et. al, which is expressly incorporated herein by reference in its entirety. One example of the grey scale electro-optical response of the present invention is shown in FIG. 22 as percentage of $V_{high}$ in pulse width. The grey scale drive method is pulse width modulation, as disclosed in Huang, X. Y. et al., *Proc. of SID* 98, 810 (1998), which is incorporated herein by reference in its entirety. It can be seen that the general trend for the electro-optical response of a rubbed ("R") cell is similar to that of an unrubbed ("UR") cell. The contrast is essentially the same also.

The comparison for electro-optical response and grey scale is carried out on a cell with rubbed 7511 on both substrates. There are no optical films on the display during these measurements. The optical films do not affect the electro-optics for the display.

The control of domain structure in stabilized cholesterics enables the optimization of the optics and electro-optics of cholesteric liquid crystal displays. The viewing cone can be made non-symmetric with an enhanced contrast region in the direction of the viewer. Brightness can therefore be optimized specifically for the viewer. Controlling the electro-optical curve enables better driving for grey scale. The electro-optical curve may be made more or less steep, depending on the application.

In general, cholesteric displays require relatively high drive voltage. The display cost may be significantly reduced by reducing the drive voltage. As described in this disclosure, the present invention enables displays to be produced with enhanced brightness that in some cases may greatly exceed the brightness of typical displays. One conventional method of reducing the drive voltage is to reduce the cell spacing. However, this generally will also reduce the peak brightness of conventional cholesteric displays.

Due to the enhanced brightness feature of the present invention, one may obtain at least a conventional degree of brightness with a reduced cell spacing. This presents several display designs. For example, if a lower cost drive is desirable, a lower drive voltage may be used at the original drive speed in the display cell having a reduced cell spacing. This allows the use of lower cost drivers. The resulting display has at least a conventional degree of brightness and uses a less expensive drive at a lower drive voltage and typical drive speed. On the other hand, if higher drive speed is more desirable, it can be obtained using a display cell having a reduced cell spacing by keeping the original drivers at the original drive voltage and the original brightness by use of the present invention. For information about suitable drives for cholesteric liquid crystal displays, see U.S. Pat. No. 5,644,330 to Catchpole et. al., entitled "Driving Method for Polymer Stabilized and Polymer Free Liquid Crystal Displays" and U.S. Pat. No. 5,251,048 to Doane and Yang, entitled "Method and Apparatus for Electronic Switching of a Reflective Color Display," which are incorporated herein by reference in their entireties.

In designing cholesteric liquid crystal displays in accordance with the present invention, use may be made of various liquid crystal materials, liquid crystal additives, substrate materials, hardcoat materials, electrode materials, and alignment layer materials, as well as suitable alignment layer treatment conditions, as disclosed in the Ser. No. 08/862,561 application entitled, "Low Viscosity Liquid Crystal Material;" and the Ser. No. 08/823,329 application entitled, "Display Device Reflecting Visible and Infrared Radiation," which are expressly incorporated herein by reference for such disclosures.

Suitable drive schemes and electronics known to those skilled in the art may be used in the present invention, including but not limited to those in the following references, all of which are incorporated herein by reference in their entireties: Doane, J. W., Yang, D. K., *Front-lit Flat Panel Display from Polymer Stabilized Cholesteric Textures,* Japan Display 92, Hiroshima October 1992; Yang, D. K. and Doane, J. W., *Cholesteric Liquid Crystal/Polymer Gel Dispersion: Reflective Display Application, SID Technical Paper Digest,* Vol XXIII, May 1992, p. 759, et seq.; U.S. patent application Ser. No. 08/390,068, entitled "Dynamic Drive Method and Apparatus for a Bistable Liquid Crystal Display;" U.S. patent application Ser. No. 08/868,709, entitled "Cumulative Drive Scheme and Method for a Liquid Crystal Display;" U.S. patent application Ser. No. 09/063,907, entitled "Unipolar Waveform Drive Method and Apparatus for a Bistable Liquid Crystal Display;" U.S. patent application Ser. No. 09/244,731, entitled "Stacked Bistable Cholesteric Liquid Crystal Display Utilizing Single Set of Drive Electronics;" and U.S. Pat. No. 5,453,863, entitled "Multistable Chiral Nematic Displays." A passive matrix multiplexing type display is preferably used in the present invention. The effect that pulse amplitudes and widths, and speeds of field removal may have on each texture is described in the U.S. Pat. No. 5,453,863.

The liquid crystal of the present invention is addressed by applying an electric field having a preferably square wave pulse of a desired width. The voltage that is used is preferably an AC square wave having a frequency that may range from about 125 Hz to about 2 kHz. Various pulse widths may be used, such as a pulse width ranging from about 6 ms to about 50 ms.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A liquid crystal display device comprising:
   chiral nematic liquid crystal material;
   cell wall structure that contains said liquid crystal material;
   at least one alignment surface that is effective to substantially homogeneously align the liquid crystal director adjacent thereto, wherein at least one of said cell wall structure and each said alignment surface cooperates with said liquid crystal material so as to form focal conic and planar textures that are stable in the absence of a field, each said alignment surface being effective to provide at least one of the following:
   (a) a brightness at a wavelength of peak reflection of said planar texture that is increased by at least 5% as compared to an identical liquid crystal device but with inhomogeneous alignment surfaces,
   (b) the focal conic texture with a reflectance that does not exceed 10% of electromagnetic radiation incident on the display device at a wavelength of peak reflection of the planar texture, and
   (c) a degree of circular polarization at a wavelength of peak reflection of the planar texture, which is increased by at least 10% as compared to an identical liquid crystal device but with inhomogeneous alignment surfaces; and
   a drive coupled to said liquid crystal material for applying an electric field to transform said liquid crystal material to at least one of the focal conic and planar textures.

2. The liquid crystal display device of claim 1 wherein said liquid crystal material has positive dielectric anisotropy.

3. The liquid crystal display device of claim 1 wherein said cell wall structure comprises a first transparent plate having a first set of transparent electrodes disposed thereon and a second plate having a second set of electrodes disposed thereon, said electrodes being electrically coupled to said drive for applying said electric field to said liquid crystal material.

4. The liquid crystal display of claim 3 wherein said second plate and said second set of electrodes are transparent.

5. The liquid crystal display of claim 1 wherein said drive comprises an AC square wave source.

6. The liquid crystal display device of claim 1 wherein each said alignment surface cooperates with said material so as to be effective in increasing brightness by at least 5% at a wavelength of peak reflection of said planar texture.

7. The liquid crystal display device of claim 1 wherein each said alignment surface is effective to provide the focal conic texture with a reflectance that does not exceed 10% of electromagnetic radiation incident on the display device at a wavelength of peak reflection of the planar texture.

8. The liquid crystal display device of claim 1 wherein each said alignment surface is effective in providing the degree of circular polarization at a wavelength of peak reflection of the planar texture, which is increased by at least 10% as compared to the identical liquid crystal device but with inhomogeneous alignment surfaces.

9. The liquid crystal display device of claim 1 wherein each said alignment surface comprises a polyimide alignment layer material.

10. The liquid crystal display device of claim 1 wherein each said alignment surface comprises at least one rubbed alignment layer material disposed adjacent said cell wall structure.

11. The liquid crystal display device of claim 1 wherein said cell wall structure comprises opposing substrates, the at least one said alignment surface being in the form of a rubbed alignment layer material disposed adjacent one of said substrates, an inhomogeneous alignment surface being disposed on the other of said substrates.

12. The liquid crystal display device of claim 1 wherein said cell wall structure comprises opposing substrates, the at least one said alignment surface being in the form of rubbed alignment layer materials each disposed adjacent one of said substrates.

13. The liquid crystal display device of claim 11 wherein the other of said substrates is upstream of said rubbed alignment layer material relative to a direction of incident light.

14. The liquid crystal display device of claim 11 wherein the other of said substrates is downstream of said rubbed alignment layer material relative to a direction of incident light.

15. The liquid crystal display device of claim 1 wherein said liquid crystal material is selected from the group consisting of various chiral nematic liquid crystal materials each having a pitch length effective to reflect a selected wavelength of electromagnetic radiation.

16. The liquid crystal display device of claim 15 wherein said selected wavelength includes at least one of infrared and visible radiation.

17. The liquid crystal display device of claim 1 wherein said drive is effective to provide said liquid crystal material with stable grey scale states.

18. The liquid crystal display device of claim 1 wherein said display is characterized by a threshold voltage suitable for multiplexing.

19. The liquid crystal display device of claim 1 wherein said material is substantially free from polymer.

20. The liquid crystal display device of claim 8 wherein each said alignment surface cooperates with said material so as to be effective in increasing brightness by at least 5% at a wavelength of peak reflection of said planar texture.

21. The liquid crystal display device of claim 8 comprising a circular polarizer adjacent said cell wall structure.

22. The liquid crystal display device of claim 8 wherein said alignment surfaces cooperate with said material effective to enable use of a driving voltage that is not substantially greater than a driving voltage used in said identical liquid crystal device but with inhomogeneous alignment surfaces.

23. The liquid crystal display device of claim 8 wherein said cell wall structure comprises opposing substrates, the at least one said alignment surface being in the form of rubbed alignment layer materials each disposed adjacent one of said substrates.

24. The liquid crystal display device of claim 23 wherein each said alignment surface is characterized by a pretilt angle of greater than about 10°.

25. The liquid crystal display device of claim 7 wherein each said alignment surface cooperates with said material so as to be effective in increasing brightness by at least 5% at a wavelength of peak reflection of said planar texture.

26. The liquid crystal display device of claim 24 wherein each said alignment surface is effective in providing the degree of circular polarization at a wavelength of peak reflection of the planar texture, which is increased by at least 20% as compared to the identical liquid crystal display device but with inhomogeneous alignment surfaces.

27. The liquid crystal display device of claim 23 comprising a circular polarizer adjacent one of said substrates.

28. The liquid crystal display device of claim 1 wherein each said alignment surface is characterized by a pretilt angle of greater than about 10°.

29. A stacked liquid crystal display device comprising:
first chiral nematic liquid crystal material and second chiral nematic liquid crystal material;
opposing substrates between which are formed a first region comprising said first material and a second region comprising said second material, said first region being stacked relative to said second region;
at least one alignment surface disposed in at least one of said first region and said second region adjacent one of said substrates so as to substantially homogeneously align the liquid crystal director adjacent thereto;
wherein at least one of said substrates and each said alignment surface cooperates with said first material to form in said first region focal conic and planar textures that are stable in the absence of a field, and at least one of said substrates and each said alignment surface cooperates with said second material to form in said second region focal conic and planar textures that are stable in the absence of a field;
wherein one of said substrates and a first said alignment surface cooperate with said second material in said second region so as to be effective in providing the focal conic texture in said second region with a reflectance that does not exceed 10% of electromagnetic radiation incident on the display device at a wavelength of peak reflection of the planar texture; and
a drive coupled to said liquid crystal material for applying an electric field to transform said first material and said second material to at least one of the focal conic and planar textures.

30. The stacked display device of claim 29 wherein said first liquid crystal material and said second liquid crystal material have positive dielectric anisotropy.

31. The stacked display device of claim 29 further comprising first and second sets of electrodes disposed on said opposing substrates, said electrodes being electrically coupled to said drive for applying said electric field to said liquid crystal material.

32. The stacked display device of claim 29 wherein said first and second sets of electrodes are transparent.

33. The stacked display device of claim 29 wherein said drive comprises an AC square wave source.

34. The stacked display device of claim 29 wherein said first material has the same twist sense as said second material, comprising a half waveplate disposed between said first region and said second region.

35. The stacked display device of claim 29 comprising a circular polarizer disposed between said first region and said second region.

36. The stacked display device of claim 29 wherein a substrate that opposes said first said alignment surface in said second region comprises a second said alignment surface.

37. The stacked display device of claim 36 wherein said second region is disposed downstream of said first region relative to a direction of incident light.

38. The stacked display device of claim 37 comprising a third said alignment surface disposed adjacent one of the substrates in said first region.

39. The stacked display device of claim 38 wherein one of said substrates that opposes said third alignment surface in said first region has an inhomogeneous alignment surface.

40. The stacked display device of claim 29 wherein one of said substrates that opposes said first alignment surface has an inhomogeneous alignment surface.

41. The stacked display device of claim 40 comprising a second said alignment surface disposed adjacent one of the substrates in said first region.

42. The stacked display device of claim 41 wherein one of said substrates that opposes said second alignment surface in said first region has an inhomogeneous alignment surface.

43. The stacked display device of claim 29 wherein the at least one said alignment surface comprises a rubbed alignment layer material.

44. The stacked display device of claim 29 wherein the at least one said alignment surface cooperates with said material effective to enable use of a driving voltage that is not substantially greater than a driving voltage used in an identical liquid crystal device but with inhomogeneous alignment surfaces.

45. The stacked display device of claim 29 wherein said first alignment surface is characterized by a pretilt angle of greater than about 10°.

46. The stacked display device of claim 29 wherein said first material has a chirality of an opposite twist sense than a chirality of said second material.

47. The stacked display device of claim 29 wherein at least one of said first liquid crystal material and said second liquid crystal material is selected from the group consisting of various chiral nematic liquid crystal materials each having a pitch length effective to reflect a selected wavelength of electromagnetic radiation.

48. The stacked display device of claim 47 wherein said selected wavelength comprises at least one of visible and infrared radiation.

49. The stacked display device of claim 29 wherein said drive is effective to provide said liquid crystal material with stable grey scale states.

50. The stacked display device of claim 29 wherein said first alignment surface cooperates with said second material so as to be effective in increasing brightness by at least 5% at a wavelength of peak reflection of said planar texture in said second region.

51. The stacked display device of claim 36 wherein said first alignment surface and said second alignment surface cooperate with said second material so as to be effective in providing in said second region a degree of circular polarization at a wavelength of peak reflection of the planar texture in said second region, which is increased by at least 10% as compared to an identical liquid crystal device but with inhomogeneous alignment surfaces.

52. The stacked display device of claim 29 comprising:
third chiral nematic liquid crystal material;
a third region between said opposing substrates comprising said third material, wherein said first region, said second region and said third region are stacked relative to each other;
said at least one alignment surface being disposed in at least one of said first region, said second region and said third region adjacent one of said substrates so as to substantially homogeneously align the liquid crystal director adjacent thereto;
wherein at least one of said substrates and the at least one said alignment surface cooperates with said third material to form in said third region focal conic and planar textures that are stable in the absence of a field; and
wherein said drive can transform said third material to at least one of the focal conic and planar textures.

53. The stacked display device of claim 52 wherein at least one of said first material, said second material and said third material may be selected from the group consisting of various chiral nematic liquid crystal materials each having a pitch length effective to reflect a selected wavelength of electromagnetic radiation.

54. The stacked display device of claim 53 wherein said selected wavelength comprises at least one of visible and infrared radiation.

55. A liquid crystal display device comprising:
chiral nematic liquid crystal material;
cell wall structure that is spaced apart at a reduced cell wall spacing and contains said liquid crystal material;
at least one alignment surface that is effective to substantially homogeneously align the liquid crystal director adjacent thereto, wherein at least one of said cell wall structure and each said alignment surface cooperates with said liquid crystal material so as to form focal conic and planar textures that are stable in the absence of a field, each said alignment surface being effective to increase brightness at a wavelength of peak reflection of said planar texture so as to be at least as high as a brightness of an identical comparative liquid crystal display device but with inhomogeneous alignment surfaces and a comparative cell wall spacing that is at least 10% greater than said reduced cell wall spacing; and
a drive coupled to said liquid crystal material for applying an electric field to transform said liquid crystal material to at least one of the focal conic and planar textures;
wherein said reduced cell wall spacing is effective to enable said drive to provide a voltage that is substantially less than a drive voltage of said comparative liquid crystal display device.

56. The liquid crystal display device of claim 55 wherein said liquid crystal material has positive dielectric anisotropy.

57. The liquid crystal display device of claim 55 wherein said cell wall structure comprises a first transparent plate having a first set of transparent electrodes disposed thereon and a second transparent plate having a second set of transparent electrodes disposed thereon, said electrodes being electrically coupled to said drive for applying said electric field to said liquid crystal material.

58. The liquid crystal display of claim 55 wherein said drive comprises an AC square wave source.

59. A liquid crystal display device comprising:
chiral nematic liquid crystal material;
cell wall structure that is spaced apart at a reduced cell wall spacing and contains said liquid crystal material;
at least one alignment surface that is effective to substantially homogeneously align the liquid crystal director adjacent thereto, wherein at least one of said cell wall structure and each said alignment surface cooperates with said liquid crystal material so as to form focal conic and planar textures that are stable in the absence of a field, each said alignment surface being effective to increase brightness at a wavelength of peak reflection of said planar texture so as to be at least as high as a brightness of an identical comparative liquid crystal display device but with inhomogeneous alignment surfaces and a comparative cell wall spacing that is at least 10% greater than said reduced cell wall spacing; and
a drive coupled to said liquid crystal material for applying an electric field to transform said liquid crystal material to at least one of the focal conic and planar textures;
wherein said reduced cell wall spacing is effective to enable said drive to provide a voltage that is applied at applied at a speed that is substantially greater than a speed at which drive voltage is applied in said comparative liquid crystal display device.

60. The liquid crystal display device of claim 59 wherein said liquid crystal material has positive dielectric anisotropy.

61. The liquid crystal display device of claim 59 wherein said cell wall structure comprises a first transparent plate having a first set of transparent electrodes disposed thereon and a second plate having a second set of electrodes disposed thereon, said electrodes being electrically coupled to said drive for applying said electric field to said liquid crystal material.

62. The liquid crystal display of claim 59 wherein said drive comprises an AC square wave source.

63. The liquid crystal display of claim 61 wherein said second plate and said second set of electrodes are transparent.

* * * * *

UNITED STATES PATENT AND TRADEMARK OFFICE
CERTIFICATE OF CORRECTION

PATENT NO.    : 6,483,563 B2
DATED         : November 19, 2002
INVENTOR(S)   : Asad A. Khan et al.

It is certified that error appears in the above-identified patent and that said Letters Patent is hereby corrected as shown below:

Column 19,
Line 31, "pcyanopentylbenzene" should read -- p-cyanopentylbenzene --.

Column 32,
Line 40, "applied at" should be deleted.

Signed and Sealed this

First Day of April, 2003

JAMES E. ROGAN
*Director of the United States Patent and Trademark Office*